(12) United States Patent
Huizen et al.

(10) Patent No.: US 11,148,596 B2
(45) Date of Patent: Oct. 19, 2021

(54) EXTERIOR REARVIEW MIRROR ASSEMBLY

(71) Applicant: Magna Mirrors of America, Inc., Holland, MI (US)

(72) Inventors: Gregory A. Huizen, Hudsonville, MI (US); Robert L. Esser, Grand Rapids, MI (US); Keith D. Foote, Caledonia, MI (US); Darryl P. De Wind, Canton, MI (US)

(73) Assignee: MAGNA MIRRORS OF AMERICA, INC., Holland, MI (US)

( * ) Notice: Subject to any disclaimer, the term of this patent is extended or adjusted under 35 U.S.C. 154(b) by 148 days.

(21) Appl. No.: 16/640,553

(22) PCT Filed: Aug. 23, 2018

(86) PCT No.: PCT/US2018/047687
§ 371 (c)(1),
(2) Date: Feb. 20, 2020

(87) PCT Pub. No.: WO2019/040711
PCT Pub. Date: Feb. 28, 2019

(65) Prior Publication Data
US 2020/0353867 A1 Nov. 12, 2020

Related U.S. Application Data

(60) Provisional application No. 62/674,057, filed on May 21, 2018, provisional application No. 62/549,102, filed on Aug. 23, 2017.

(51) Int. Cl.
*B60R 1/074* (2006.01)
*B60R 1/12* (2006.01)

(52) U.S. Cl.
CPC ............ *B60R 1/074* (2013.01); *B60R 1/1207* (2013.01); *B60R 2001/1253* (2013.01)

(58) Field of Classification Search
None
See application file for complete search history.

(56) References Cited

U.S. PATENT DOCUMENTS

| 1,114,559 A | 10/1914 | Weed |
| 2,307,568 A | 1/1943 | Colbert |
| (Continued) | | |

FOREIGN PATENT DOCUMENTS

| DE | 1530861 A1 | 6/1969 |
| DE | 1815368 B | 4/1970 |
| (Continued) | | |

OTHER PUBLICATIONS

UN Regulation No. 46, Revision 3, "Uniform provisions concerning the approval of devices for indirect vision and of motor vehicles with regard to the installation of these devices." (Year: 2009).

(Continued)

*Primary Examiner* — Jennifer D. Carruth
(74) *Attorney, Agent, or Firm* — Honigman LLP

(57) ABSTRACT

An exterior rearview mirror assembly for mounting at a vehicle includes a mounting arm configured for attachment at an exterior portion of the vehicle, and a mirror head having a mirror casing, a mirror reflective element and a mirror actuator. The mounting arm is received through an aperture in the mirror casing and the mirror actuator is attached at the mounting arm inside the mirror casing. The mirror actuator is electrically operable to adjust the mirror reflective element and the mirror casing relative to the mounting arm. The aperture allows for movement of the mirror casing relative to the mounting arm during operation of the mirror actuator. A powerfold actuator may be operable (Continued)

to pivot the mirror head relative to the base portion between a folded or non-use position and an extended or use position.

28 Claims, 18 Drawing Sheets

(56) References Cited

U.S. PATENT DOCUMENTS

| | | |
|---|---|---|
| 2,552,074 A | 5/1951 | Thompson |
| 2,839,965 A | 6/1958 | Budreck |
| 2,969,715 A | 1/1961 | Mosby |
| 3,119,591 A | 1/1964 | Malecki |
| 3,407,684 A | 10/1968 | Van Noord |
| 3,459,470 A | 8/1969 | Hahn |
| 3,549,243 A | 12/1970 | Horwitt et al. |
| 3,575,496 A | 4/1971 | Pollock et al. |
| 3,711,179 A | 1/1973 | Takeda |
| 4,470,323 A | 9/1984 | Manzoni |
| 4,477,149 A | 10/1984 | Crespy |
| 4,512,633 A | 4/1985 | Manzoni |
| 4,558,930 A | 12/1985 | Deedreek |
| 4,699,024 A | 10/1987 | Iida et al. |
| 4,826,289 A | 5/1989 | Vandenbrink et al. |
| 4,832,477 A | 5/1989 | Torii et al. |
| 4,936,670 A | 6/1990 | Yoo |
| 4,940,321 A | 7/1990 | Yoshida |
| 4,991,950 A | 2/1991 | Lang et al. |
| 5,005,797 A | 4/1991 | Maekawa et al. |
| 5,190,499 A | 3/1993 | Mori et al. |
| 5,210,651 A | 5/1993 | Shibuya et al. |
| 5,343,333 A | 8/1994 | Nagayama et al. |
| 5,371,659 A | 12/1994 | Pastrick et al. |
| 5,424,898 A | 6/1995 | Larson et al. |
| 5,473,476 A | 12/1995 | Fujita |
| 5,477,390 A | 12/1995 | Boddy et al. |
| 5,489,080 A | 2/1996 | Allen |
| 5,497,306 A | 3/1996 | Pastrick |
| 5,513,048 A | 4/1996 | Chen |
| 5,546,239 A | 8/1996 | Lewis |
| 5,572,376 A | 11/1996 | Pace |
| 5,579,178 A | 11/1996 | Mochizuki |
| 5,624,176 A | 4/1997 | O'Farrell et al. |
| 5,659,423 A | 8/1997 | Schierbeek et al. |
| 5,669,699 A | 9/1997 | Pastrick et al. |
| 5,703,731 A | 12/1997 | Boddy et al. |
| 5,786,772 A | 7/1998 | Schofield et al. |
| 5,796,176 A | 8/1998 | Kramer et al. |
| 5,823,654 A | 10/1998 | Pastrick et al. |
| 5,864,435 A | 1/1999 | Toyama |
| 5,900,999 A | 5/1999 | Huizenga et al. |
| 5,903,402 A | 5/1999 | Hoek |
| 5,929,786 A | 7/1999 | Schofield et al. |
| 5,949,591 A | 9/1999 | Whitehead |
| 5,969,890 A | 10/1999 | Whitehead |
| 5,986,364 A | 11/1999 | Bingle et al. |
| 6,146,003 A | 11/2000 | Thau |
| 6,170,957 B1 | 1/2001 | Kaspar |
| 6,176,602 B1 | 1/2001 | Pastrick et al. |
| 6,198,409 B1 | 3/2001 | Schofield et al. |
| 6,213,612 B1 | 4/2001 | Schnell et al. |
| 6,227,689 B1 | 5/2001 | Miller |
| 6,229,226 B1 | 5/2001 | Kramer et al. |
| 6,239,928 B1 | 5/2001 | Whitehead et al. |
| 6,243,218 B1 | 6/2001 | Whitehead |
| 6,270,227 B1 | 8/2001 | Tsuyama |
| 6,276,821 B1 | 8/2001 | Pastrick et al. |
| 6,312,135 B1 | 11/2001 | Polzer |
| 6,325,518 B1 | 12/2001 | Whitehead et al. |
| 6,362,548 B1 | 3/2002 | Bingle et al. |
| 6,439,755 B1 | 8/2002 | Fant, Jr. et al. |
| 6,467,920 B2 | 10/2002 | Schnell et al. |
| 6,481,878 B2 | 11/2002 | Thau |
| 6,501,387 B2 | 12/2002 | Skiver et al. |
| 6,522,451 B1 | 2/2003 | Lynam |
| 6,582,109 B2 | 6/2003 | Miller |
| 6,672,731 B2 | 1/2004 | Schnell et al. |
| 6,682,200 B2 | 1/2004 | Tsuyama et al. |
| 6,685,864 B2 | 2/2004 | Bingle et al. |
| 6,690,268 B2 | 2/2004 | Schofield et al. |
| 6,698,905 B1 | 3/2004 | Whitehead |
| 6,717,712 B2 | 4/2004 | Lynam et al. |
| 6,755,544 B2 | 6/2004 | Schnell et al. |
| 6,847,288 B1 | 1/2005 | Baschnagel, III |
| 6,871,970 B2 | 3/2005 | Georges |
| 6,882,287 B2 | 4/2005 | Schofield |
| 6,916,100 B2 | 7/2005 | Pavao |
| 6,932,497 B1 | 8/2005 | Huang |
| 7,035,678 B2 | 4/2006 | Lynam et al. |
| 7,038,577 B2 | 5/2006 | Pawlicki et al. |
| 7,070,287 B2 | 7/2006 | Foote et al. |
| 7,073,914 B2 | 7/2006 | Pavao |
| 7,080,914 B1 | 7/2006 | Boddy |
| 7,083,312 B2 | 8/2006 | Pastrick et al. |
| 7,093,946 B2 | 8/2006 | Barve et al. |
| 7,104,663 B2 | 9/2006 | Whitehead |
| 7,126,456 B2 | 10/2006 | Boddy et al. |
| 7,159,992 B2 | 1/2007 | Foote |
| 7,178,925 B1 | 2/2007 | Tidwell |
| 7,184,190 B2 | 2/2007 | McCabe et al. |
| 7,195,381 B2 | 3/2007 | Lynam et al. |
| 7,249,860 B2 | 7/2007 | Kulas et al. |
| 7,255,451 B2 | 8/2007 | McCabe et al. |
| 7,267,449 B1 | 9/2007 | Boddy et al. |
| 7,287,867 B2 | 10/2007 | Wellington et al. |
| 7,289,037 B2 | 10/2007 | Uken et al. |
| 7,314,285 B2 | 1/2008 | Ruse et al. |
| 7,322,710 B2 | 1/2008 | Foote et al. |
| 7,338,177 B2 | 3/2008 | Lynam |
| 7,342,707 B2 | 3/2008 | Roberts et al. |
| 7,370,985 B2 | 5/2008 | Boddy et al. |
| 7,492,281 B2 | 2/2009 | Lynam et al. |
| 7,581,859 B2 | 9/2009 | Lynam |
| 7,626,749 B2 | 12/2009 | Baur et al. |
| 7,720,580 B2 | 5/2010 | Higgins-Luthman |
| 7,722,199 B2 | 5/2010 | DeWard et al. |
| 7,748,856 B2 | 7/2010 | Zhao |
| 7,777,611 B2 | 8/2010 | Desai |
| 7,944,371 B2 | 5/2011 | Foote et al. |
| 8,049,640 B2 | 11/2011 | Uken et al. |
| 8,262,240 B2 | 9/2012 | Negel |
| 8,764,256 B2 | 7/2014 | Foote et al. |
| 8,915,601 B2 | 12/2014 | Foote et al. |
| 9,067,541 B2 | 6/2015 | Sobecki et al. |
| 9,174,578 B2 | 11/2015 | Uken et al. |
| 9,827,913 B2 | 11/2017 | De Wind et al. |
| 9,969,334 B2 | 5/2018 | De Wind et al. |
| 10,099,618 B2 | 10/2018 | Foote et al. |
| 10,261,648 B2 | 4/2019 | Uken et al. |
| 2001/0015862 A1 | 8/2001 | Lynam et al. |
| 2002/0063978 A1 | 5/2002 | Guttenberger et al. |
| 2002/0141085 A1 | 10/2002 | Whitehead et al. |
| 2003/0001301 A1 | 1/2003 | Duroux et al. |
| 2003/0202263 A1 | 10/2003 | Georges |
| 2004/0196578 A1 | 10/2004 | Dumont et al. |
| 2005/0243449 A1 | 11/2005 | Pavao |
| 2006/0061008 A1 | 3/2006 | Kamer et al. |
| 2006/0285254 A1 | 12/2006 | Ruse et al. |
| 2007/0002477 A1 | 1/2007 | Whitehead |
| 2007/0058257 A1 | 3/2007 | Lynam |
| 2007/0285812 A1 | 12/2007 | Foote et al. |
| 2008/0043354 A1 | 2/2008 | Fukai et al. |
| 2009/0040306 A1 | 2/2009 | Foote et al. |
| 2009/0161379 A1 | 6/2009 | Liesener |
| 2009/0251785 A1 | 10/2009 | Bruhnke et al. |
| 2009/0251913 A1 | 10/2009 | Bruhnke et al. |
| 2010/0067131 A1 | 3/2010 | Negel |
| 2010/0182143 A1 | 7/2010 | Lynam |
| 2010/0238570 A1 | 9/2010 | Reedman et al. |
| 2010/0321758 A1 | 12/2010 | Bugno et al. |
| 2011/0194203 A1 | 8/2011 | Foote et al. |
| 2012/0038964 A1 | 2/2012 | De Wind et al. |
| 2012/0236388 A1 | 9/2012 | De Wind et al. |
| 2014/0022390 A1 | 1/2014 | Blank et al. |
| 2014/0285666 A1 | 9/2014 | O'Connell et al. |

(56) References Cited

U.S. PATENT DOCUMENTS

| | | |
|---|---|---|
| 2015/0097955 A1 | 4/2015 | De Wind et al. |
| 2015/0224930 A1 | 8/2015 | Foote et al. |
| 2016/0006932 A1 | 1/2016 | Zhang et al. |
| 2017/0267179 A1* | 9/2017 | Herrmann ............ B60Q 1/2665 |
| 2018/0001823 A1 | 1/2018 | Bhaskar |
| 2018/0134218 A1 | 5/2018 | Lettis et al. |
| 2018/0194287 A1 | 7/2018 | Arndt et al. |
| 2018/0265006 A1 | 9/2018 | Tseng |
| 2019/0039522 A1 | 2/2019 | Foote et al. |
| 2019/0243492 A1 | 8/2019 | Uken et al. |

FOREIGN PATENT DOCUMENTS

| | | |
|---|---|---|
| DE | 1755577 B1 | 5/1972 |
| DE | 4141657 A1 | 7/1992 |
| DE | 19538770 A1 | 4/1997 |
| DE | 19601429 C1 | 4/1997 |
| DE | 102008026039 A1 | 12/2009 |
| DE | 202010005203 U1 | 9/2010 |
| DE | 102009031809 A1 | 1/2011 |
| EP | 0064421 A1 | 11/1982 |
| EP | 0314839 A1 | 5/1989 |
| EP | 0780266 A2 | 6/1997 |
| EP | 1000807 A2 | 5/2000 |
| EP | 1188616 A2 | 3/2002 |
| EP | 1300289 A2 | 4/2003 |
| EP | 1755923 A1 | 2/2007 |
| EP | 2017127 A1 | 1/2009 |
| EP | 2112022 A1 | 10/2009 |
| EP | 2165886 A1 | 3/2010 |
| EP | 2492144 A1 | 8/2012 |
| EP | 2492145 A1 | 8/2012 |
| EP | 3321132 A1 | 5/2018 |
| FR | 2503647 A1 | 10/1982 |
| FR | 2605567 A1 | 4/1988 |
| GB | 2197829 A | 6/1988 |
| GB | 2244965 A | 12/1991 |
| WO | 2010124064 A1 | 10/2010 |
| WO | 2011044312 A1 | 4/2011 |
| WO | 2013071070 A1 | 5/2013 |
| WO | 2013126719 A2 | 8/2013 |
| WO | 2017135361 A1 | 8/2017 |

OTHER PUBLICATIONS

Yi Zhang et al., Basic Kinematics of Constrained Rigid Bodies, in Introduction to Mechanisms, Carnegie Mellon University, https://www.cs.cmu.edu/~rapidproto/mechanisms/chpt4.html.

IPR Proceeding No. IPR2020-00777, filed Mar. 31, 2020, re U.S. Pat. No. 10,261,648.

International Search Report and Written Opinion dated Oct. 16, 2018, from corresponding PCT Application No. PCT/US2018/047687.

* cited by examiner

EXTERIOR REARVIEW MIRROR ASSEMBLY

CROSS REFERENCE TO RELATED APPLICATIONS

The present application is a 371 national phase filing of PCT Application No. PCT/US2018/047687, filed Aug. 23, 2018, which claims the filing benefits of U.S. provisional applications, Ser. No. 62/674,057, filed May 21, 2018, and Ser. No. 62/549,102, filed Aug. 23, 2017, which are hereby incorporated herein by reference in their entireties.

FIELD OF THE INVENTION

The present invention relates generally to the field of rearview mirror assemblies for vehicles and, more particularly, to an exterior rearview mirror assembly that is operable to provide an adjustable rearward field of view for a driver of an equipped vehicle.

BACKGROUND OF THE INVENTION

Typically, an exterior rearview mirror assembly includes a mirror actuator that is operable to adjust a mirror reflective element relative to the mirror casing so as to adjust a rearward field of view of the mirror reflective element of the mirror assembly for viewing by the driver of the vehicle. The reflective element and actuator are disposed in the mirror casing and the actuator adjusts the reflective element relative to the mirror casing. In such conventional exterior mirror assemblies, operation of the mirror actuator does not adjust or move the position of the mirror casing. In such conventional exterior rearview mirror assemblies, a powerfold actuator disposed at a mounting structure can be operable to pivot or fold the mirror casing relative to the side of the vehicle.

SUMMARY OF THE INVENTION

The present invention provides an exterior rearview mirror assembly configured for mounting at an exterior portion of a vehicle. The exterior rearview mirror assembly comprises a mirror head and includes a mirror actuator that is operable to pivot and adjust the mirror head relative to a mounting arm or base that attached at the side of the vehicle. The mirror head comprises a mirror reflective element and a mirror casing that both move/adjust together similarly and in tandem with movement/adjustment of the mirror head relative to the mounting arm/base that is attached at the side of the vehicle. Movement/adjustment of the mirror head by operation of the mirror actuator causes the mirror reflective element to move/adjust similarly and in tandem with movement/adjustment of the mirror head so that, via operation of the mirror actuator by a driver of the vehicle, the rearward field of view of the mirror reflective element as viewed by the driver of the vehicle can be set to that driver's desires/needs. The mirror assembly may also include a powerfold actuator that provides a powerfold adjustment to move the mirror head relative to the side of the vehicle from an extended position (used during normal driving of the vehicle) to a folded-to-the-vehicle/stowed position (used during such as when the vehicle is parked and is not being driven normally).

The mirror head can house an accessory that moves in tandem with the mirror reflective element and the mirror casing of the mirror head, and the accessory is adapted to provide a function to meet regulation/performance requirements throughout the range of adjustment of the mirror head relative to the mounting arm/base as attached at the side of the vehicle. For example, the accessory may comprise a turn signal indicator which, when activated, emits a beam of light that spans and satisfies a regulation-required region throughout the range of adjustment of the mirror head relative to the mounting arm/base throughout the range of adjustment via the mirror actuator of the field of view of the mirror reflective element for viewing by the driver of the vehicle. Optionally, the accessory may comprise a camera that has a field of view rearward, sideward and/or forward of where the camera is disposed at the mirror assembly at the side of the vehicle, with the camera's field of view being sufficiently wide so as to encompass a target region throughout the range of adjustment of the mirror head relative to the mounting arm and the side of the vehicle. An image processor may process image data captured by the camera to digitally and dynamically crop the frames of captured image data (and to electronically reduce optical distortion due to the wide-angle lensing used with such camera) in accordance with or responsive to or as a function of the position or orientation of the mirror head as adjusted by the driver such that the image data used for display at a video screen viewable by the driver or for machine vision-based object detection or the like is electronically cropped or limited to encompass the desired or appropriate or selected region at the side of the vehicle.

These and other objects, advantages, purposes and features of the present invention will become apparent upon review of the following specification in conjunction with the drawings.

DESCRIPTION OF THE PREFERRED EMBODIMENTS

Figure 1:
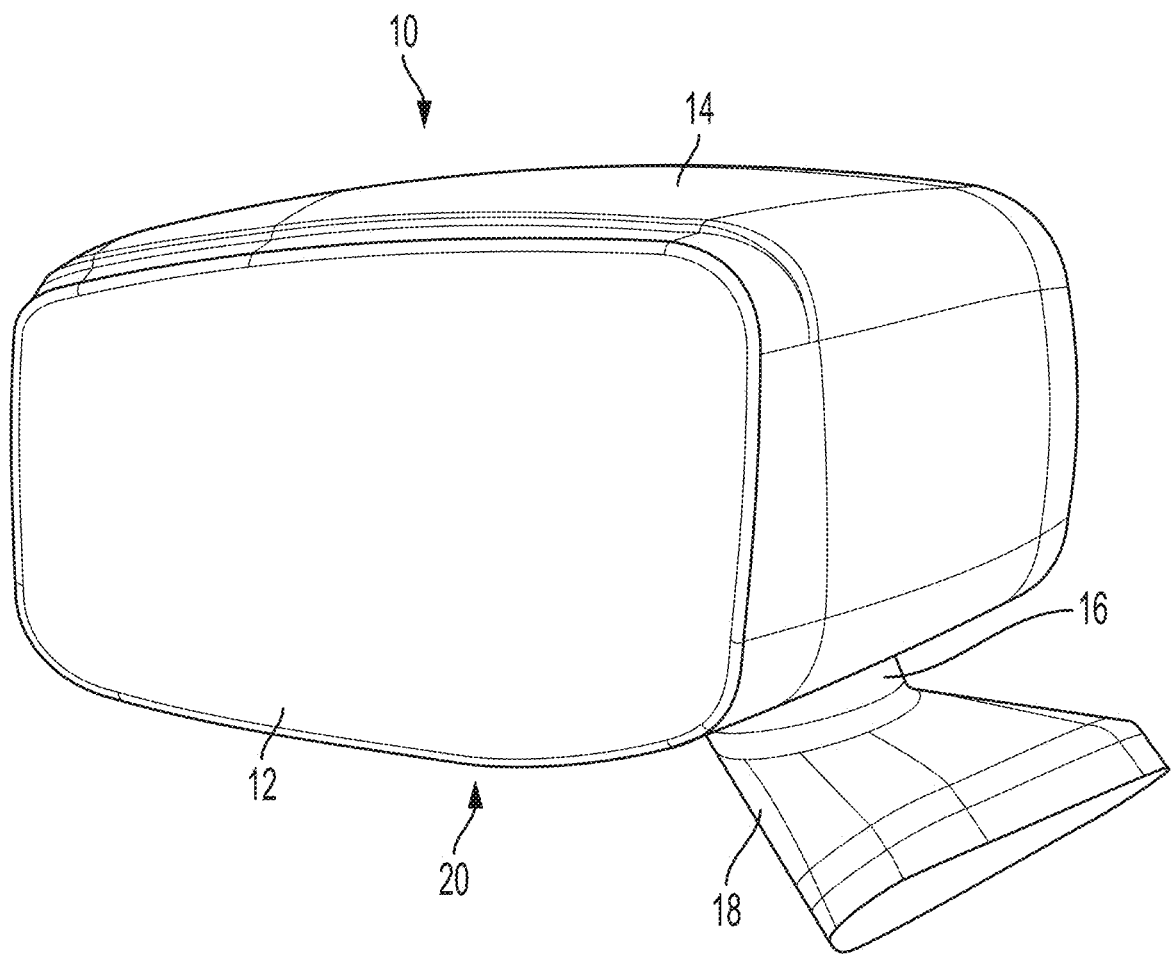
FIG. 1 is a perspective view of an exterior rearview mirror assembly in accordance with the present invention.

An exterior rearview mirror assembly of the present invention may comprise dual actuators and dual pivot axes for adjusting a mirror head and reflective element relative to a side of a vehicle at which the mirror assembly is mounted. The mirror assembly may utilize aspects of the mirror assemblies described in U.S. Publication Nos. US-2015-0224930 and/or US-2015-0097955, and/or U.S. Pat. Nos. 9,487,142; 9,346,403 and/or 8,915,601, and/or PCT Application No. PCT/162018/056228, filed Aug. 17, 2018, which are hereby incorporated herein by reference in their entireties.

Referring now to the drawings and the illustrative embodiments depicted therein, and with reference to FIGS. 1-7, an exterior rearview mirror assembly 10 includes a mirror reflective element 12 attached at an actuator 22 (via a back plate 24 and a head mounting plate 26 and actuator adaptor plate 28) that is operable to adjust the mirror reflective element relative to a mounting arm or base portion 18 (that fixedly attaches such as via bolts at the vehicle, and such as via bolting at a front door portion of the vehicle). The mirror head 20 comprises the mirror reflective element 12, the back plate 24 and the mirror casing 14. In the illustrated embodiment, the mirror reflective element 12 is attached to the back plate or glass case 24, which is attached at the head mounting plate 26, which has the mirror casing 14 attached thereto. The mirror reflective element 14 thus attaches to a polymeric molded mirror backing plate that, at one side, supports the mirror reflective element (and typically with a heater pad disposed therebetween), and at the other opposing side, includes structure for mounting at the mirror actuator 22. The backing plate and/or structure may utilize aspects of the mirror assemblies described in U.S. Pat. Nos. 8,058,977; 7,944,371 and/or 7,581,859, which are hereby incorporated herein by reference in their entireties.

The mirror head 20 is adjustable relative to the base portion 18 (such as at an outer end portion 16 of the base portion 18) via the actuator 22 fixedly attached at a bracket portion 23a (FIGS. 8 and 9) of the mirror assembly. As shown in FIGS. 8-12, a mounting post or structure 23b is received through or disposed at a gap or opening or aperture of the mirror casing 14, with the opening providing clearance or a gap between the casing wall and the mounting post to allow for adjustment of the mirror casing and reflective element (the mirror head) relative to the base portion 18, without direct contact or fouling between the mirror casing and the base portion during mirror head adjustment (but optionally with sealing and/or sliding contact between a gasket or seal and the mirror casing and/or base portion, as discussed below). The mirror casing may be formed by polymeric molding (such as injection molding) and the opening or hole or aperture may be established through the mirror casing during the molding of the mirror casing.

The actuator 22 is mounted at the bracket portion 23a at the upper end of mounting post or structure 23b and is operable to adjust the mirror back plate and reflective element and mirror casing in tandem to adjust the rearward field of view of the reflective element as viewed by the driver of the vehicle. The actuator 22 provides both vertical and horizontal adjustment of the mirror head relative to the base portion (e.g., up and down and side-to-side adjustment of the mirror head to vertically and/or horizontally adjust the field of view of the reflective element as viewed by the driver). Actuator 22 preferable comprises two motors that are electrically operable to adjust the mirror head in two orthogonal directions and can be constructed utilizing aspects of the actuators described in U.S. Pat. Nos. 5,986,364; 7,090,363 and/or 6,213,612, which are all hereby incorporated herein by reference in their entireties. The mirror head 20 may also pivot about a generally vertical or canted pivot axis to provide a breakaway mirror configuration (and optionally, another actuator may be disposed at the base portion or bracket to provide a powerfold function, as discussed below). Powerfold functions are described in likes of U.S. Pat. Nos. 7,093,946 and 7,887,202, which are hereby incorporated herein by reference in their entireties.

In the illustrated embodiment, the mirror casing is fixed relative to the glass or reflective element and is adjustable via the actuator relative to the bracket or mounting arm or mounting base. In a typical conventional outside mirror, the reflective element is adjustable independently of the mirror casing, which is fixed to the bracket. Thus, in a conventional outside mirror, when in use on a vehicle, the mirror casing is at a fixed/non-varying position relative to the side of the vehicle, and adjustment by the driver of the mirror reflective element has no impact and causes no change to the position of the mirror casing relative to the side of the vehicle. In sharp contrast, and as in the illustrated embodiment, the mirror casing moves with the reflective element (so that the entire mirror head is adjusted or moves to adjust the rearward field of view at the reflective element). For sake of clarity, the assembly of the mirror casing, head mounting plate, glass-case or back plate, tape and reflective element is referred to as the mirror head or mirror head assembly. The bracket design is used as a mount for the mirror actuator and is coupled with the base to provide a folding pivot.

Figure 2:
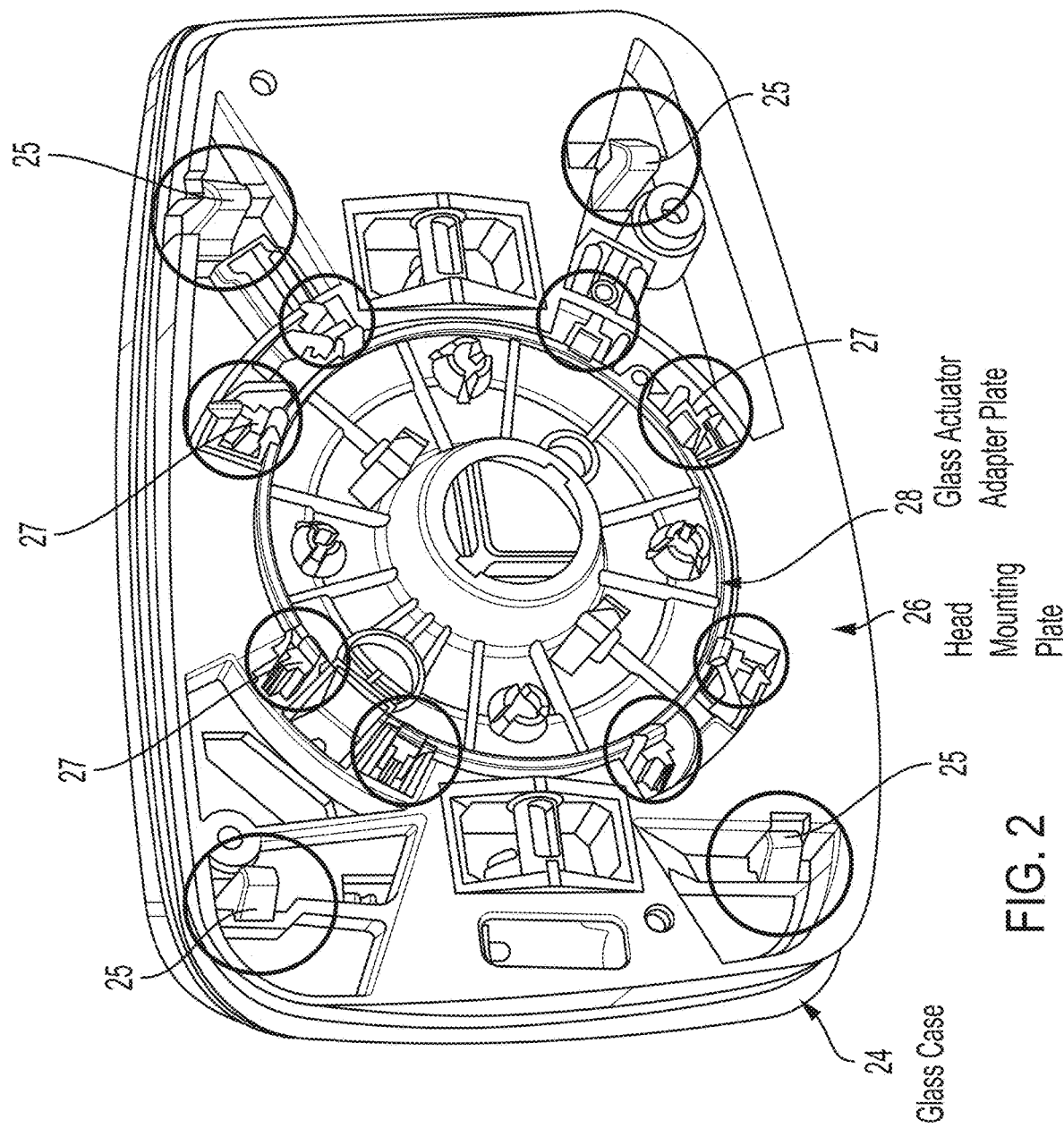
FIG. 2 is a perspective view of the mirror actuator mounting plate at the rear of the mirror reflective element.
Figure 3:
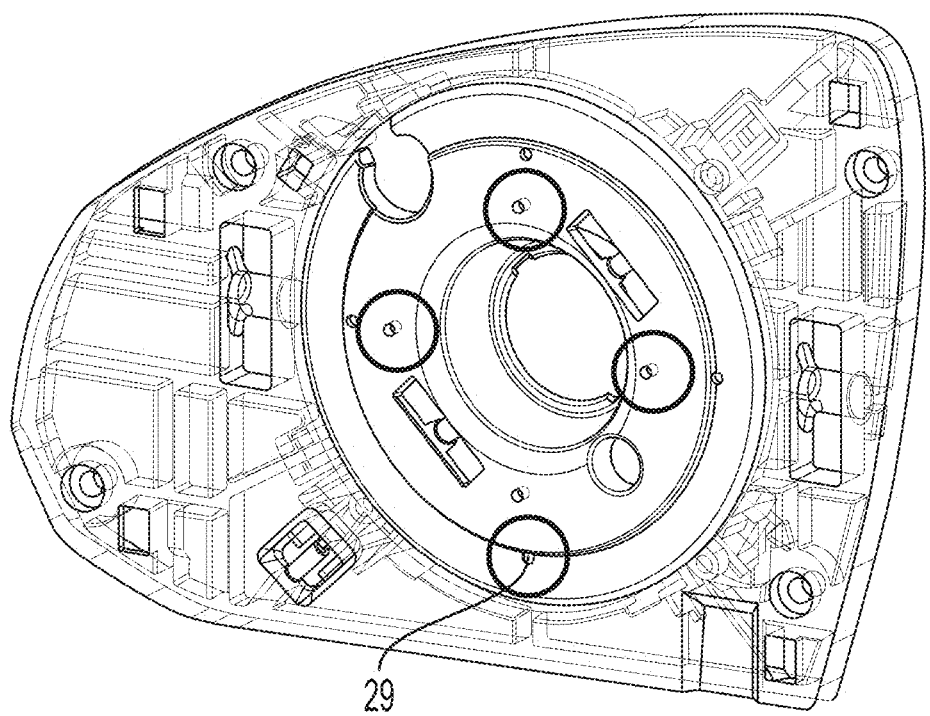
FIG. 3 is another perspective view of the mirror actuator mounting plate and mirror backing plate.
Figure 4:
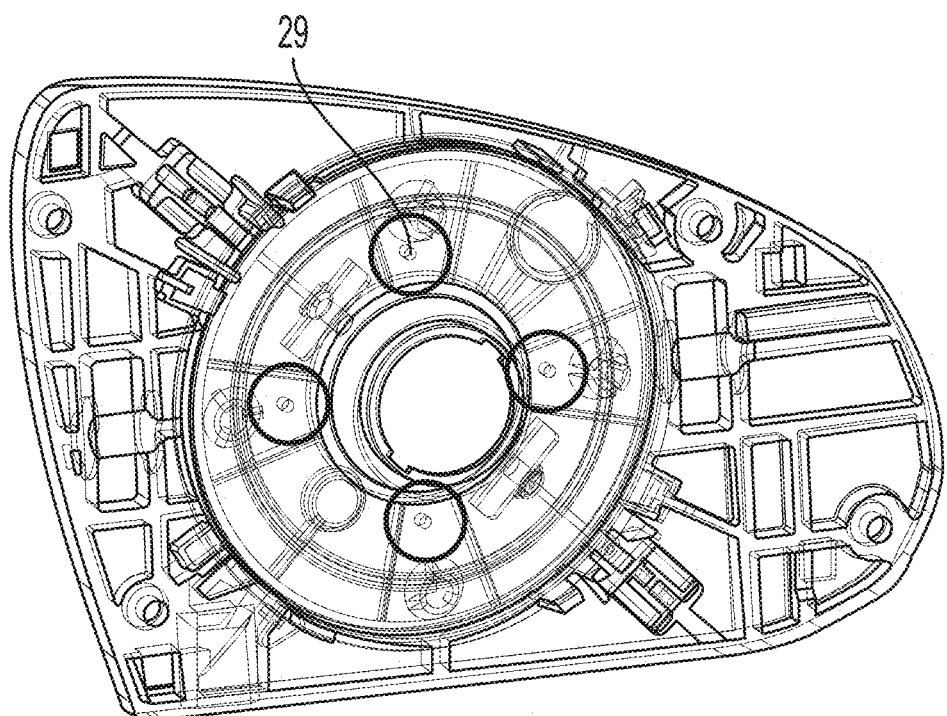
FIG. 4 is a perspective view of the mirror backing plate (with the mirror reflective element not attached thereat)

As shown in FIGS. 2-4, the glass case or back plate is attached to the actuator through the head mounting plate. The head mounting plate attaches to the glass actuator adapter plate through a glass case clip ring. The glass case or back plate attaches to the head mounting plate with four clips 25 on the outer perimeter highlighted by the larger circles in FIG. 2. The glass case also provides additional support to the glass case clip ring by backing up the head mounting plate clips with eight bosses 27 highlighted by the smaller circles in FIG. 2. Optionally, and such as shown in FIGS. 3 and 4, the head mounting plate may be attached to the glass actuator adapter plate by a radial pattern of screws or fasteners 29 (see circles in FIGS. 3 and 4).

Thus, in the illustrated embodiment, the mirror reflective element is attached at the back plate 24 (such as via an adhesive or tape or via an adhesively applied heater pad or the like), and the back plate 24 is snap attached at the head mounting plate 26 via the snap tabs 25 protruding through openings in the head mounting plate and engaging a surface of the head mounting plate to limit or preclude retraction of the tabs from the head mounting plate. The actuator adapter plate 28 may snap attach at the head mounting plate or may be fastened thereto via a plurality of fasteners. The actuator is mounted at the actuator adapter plate via fasteners or snap attachment or the like, whereby actuation of the actuator adjusts or moves the actuator adapter plate, the head mounting plate, the back plate, the reflective element, and the mirror casing, together and in tandem with one another, relative to the mounting portion or base portion.

Figure 5:
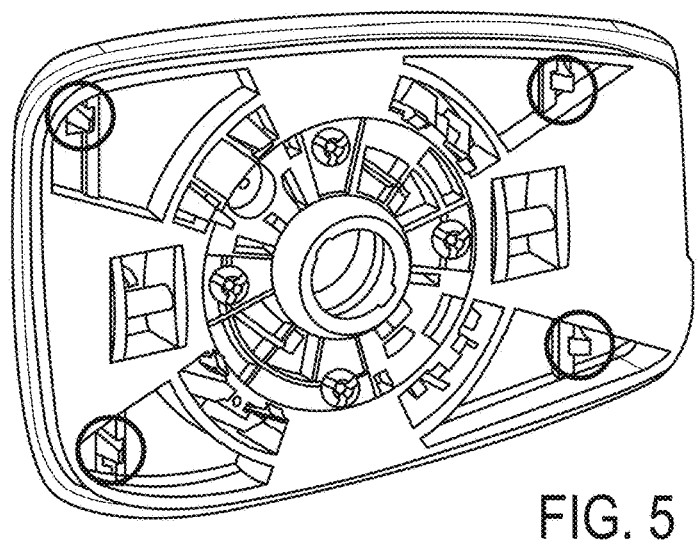
FIG. 5 is a perspective view of a mirror backing plate with an integral actuator adapter plate in accordance with the present invention.
Figure 6:
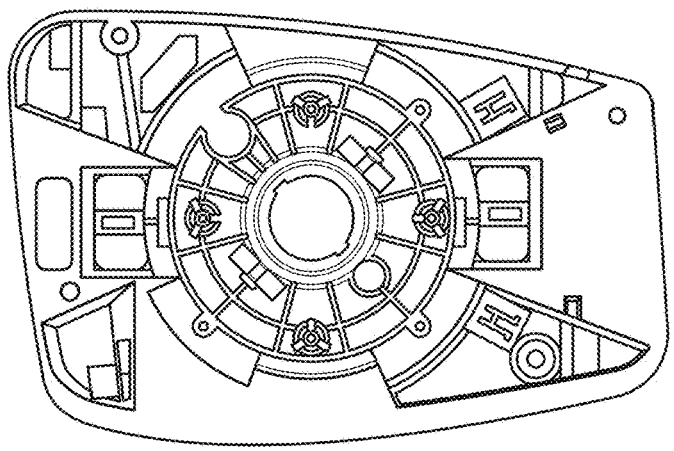
FIG. 6 is a plan view of the mirror backing plate of FIG. 5.
Figure 7:
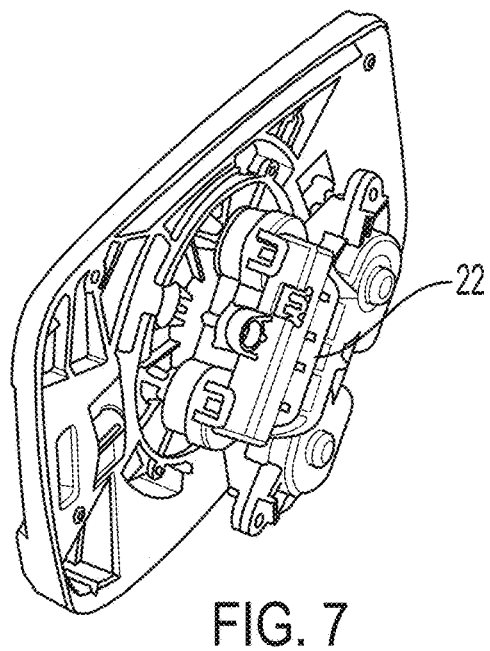
FIG. 7 is a perspective view of the mirror backing plate, with an actuator attached thereat.

Referring now to FIGS. 5-7, a full width glass actuator adapter plate may replace the adapter plate. The profile of the full width adapter plate matches the glass and housing profile and allows for the attachment of the housing with screws (or other fasteners or clips or the like) and for the glass case with clips on the perimeter as well as a glass case clip ring. As shown in FIG. 7, the actuator 22 attaches to the adapter plate, and the actuator is mounted or attached at the bracket 23a (FIGS. 8 and 9).

Figure 8:
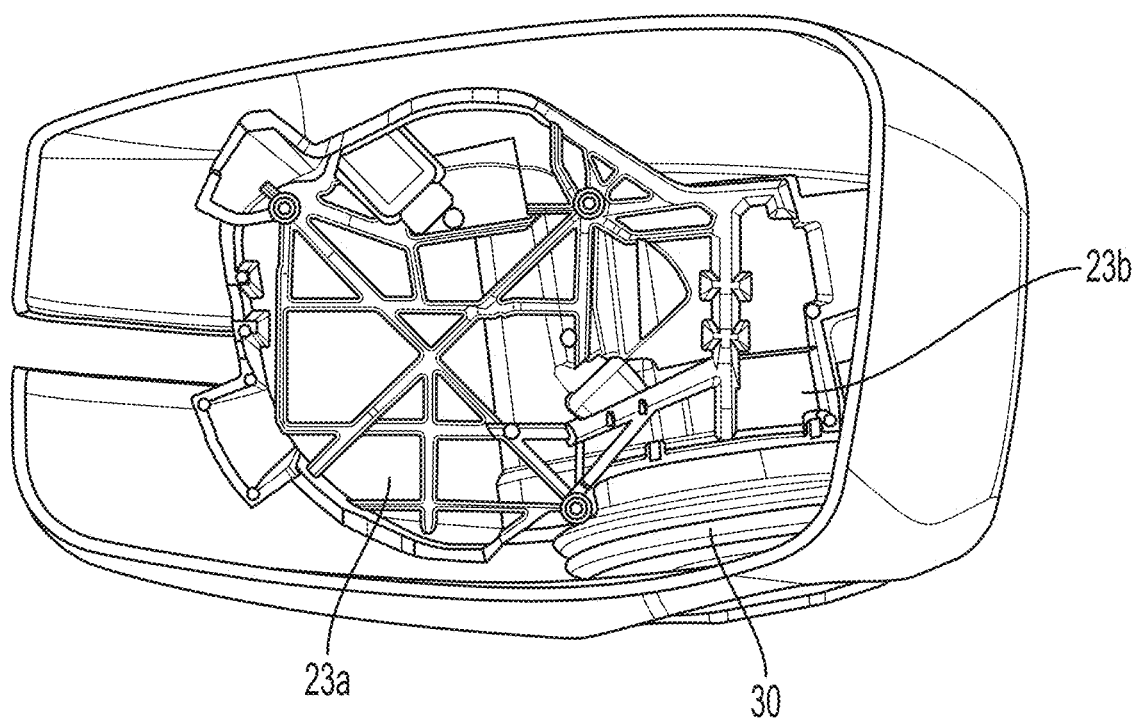
FIG. 8 is a perspective view of a mirror casing and actuator bracket for the mirror assembly of the present invention.
Figure 9:
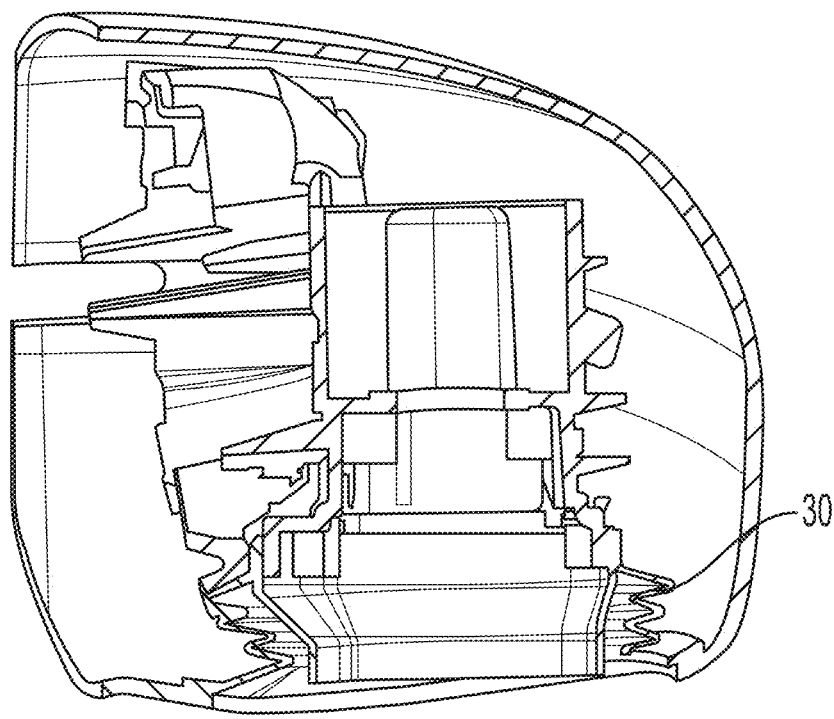
FIG. 9 is a sectional view of the mirror casing and actuator bracket of FIG. 8.
Figure 12:
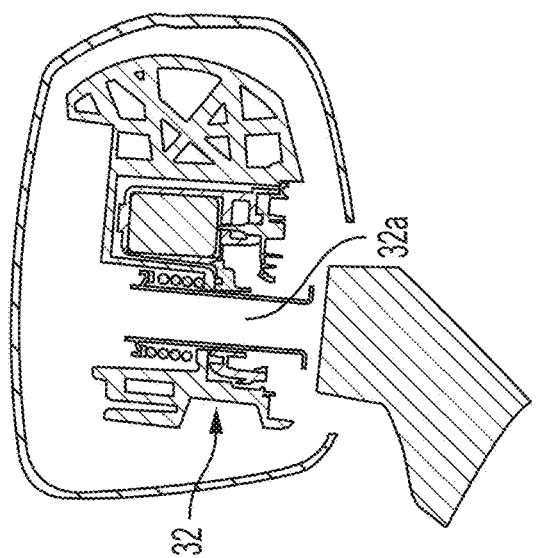
FIG. 12 is a sectional view of the mirror assembly of FIG. 11.
Figure 11:
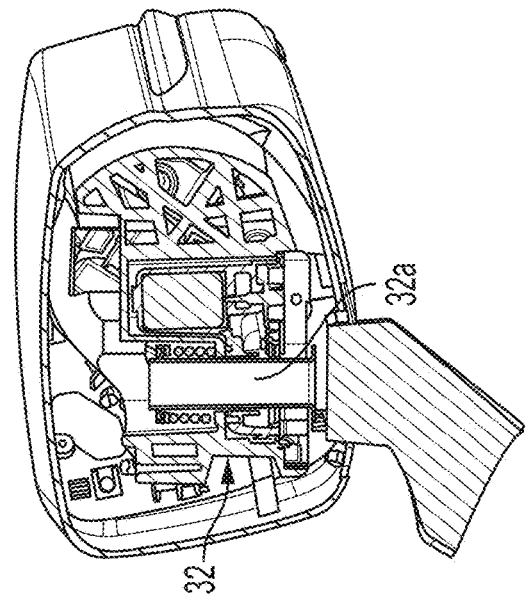
FIG. 11 is another rear perspective view of the mirror assembly, with a rear portion of the mirror casing removed to show additional details.
Figure 10:
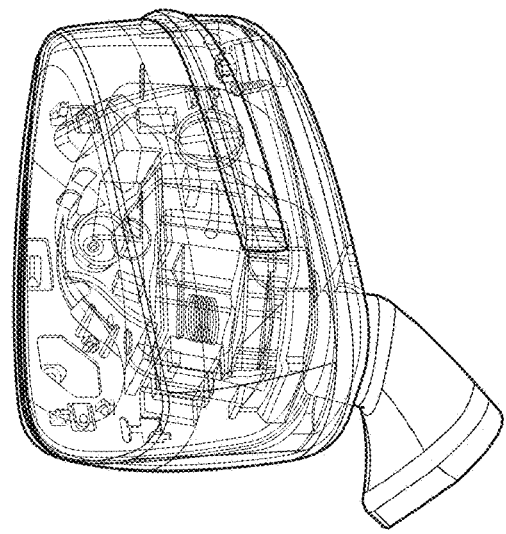
FIG. 10 is a rear perspective view of the mirror assembly of the present invention.

As shown in FIGS. 8 and 9, the bracket 23a includes the post portion 23b that pivotally mounts to the base portion 18. A gasket or head seal 30 is provided at the post 23b to generally seal or close over the opening of the mirror casing to limit water or dirt intrusion into the mirror casing. The head seal may comprise any suitable material, such as, for example, an EPDM rubber material. In the illustrated embodiment, the head seal comprises a flexible bellows configuration or design that allows movement of the mirror head relative to the mounting base and protects the internal components of the mirror assembly from water and contamination.

Optionally, the mirror assembly may also provide a power fold function that operates to pivot the mirror head about a generally vertical or canted axis between a use position (where the mirror head is extended from the side of the vehicle and the reflective element is viewable by the driver of the vehicle and provides the driver with the desired or selected rearward field of view) and a folded or non-use or park position (where the mirror head is folded toward the side of the vehicle so that the reflective element is generally along the side of the vehicle and does not provide the driver with the selected rearward field of view). Optionally, for example, and with reference to FIGS. 10-12, the glass actuator bracket also houses a powerfold actuator 32 near the opening of the housing where the base enters the mirror head. The powerfold actuator operates to rotate the mirror head about a pivot assembly 32a to pivot the mirror head between the use and non-use positions. This creates a separate folding pivot from the mirror head pivot about the glass actuator.

Figure 13:
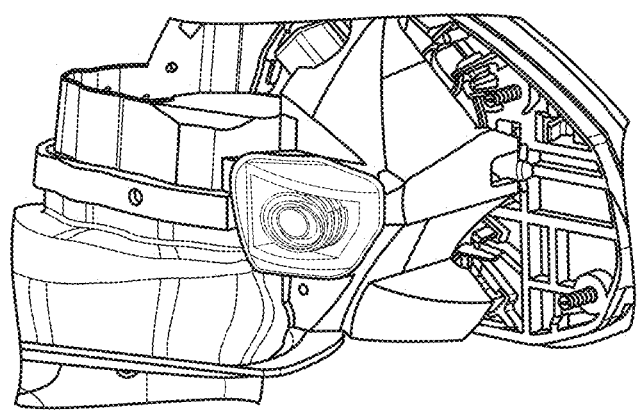
FIG. 13 is a perspective view of the actuator bracket and mirror reflective element assembly, shown with an optional wind load stabilizer.
Figure 14:
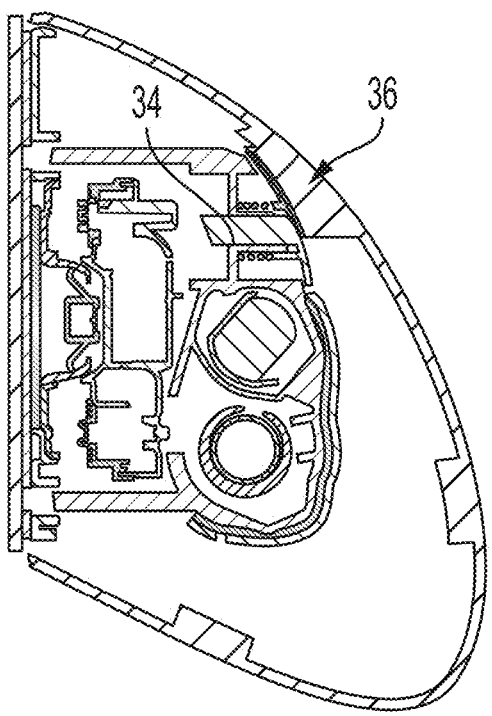
FIG. 14 is a sectional view of the mirror head of FIG. 13.
Figure 15:
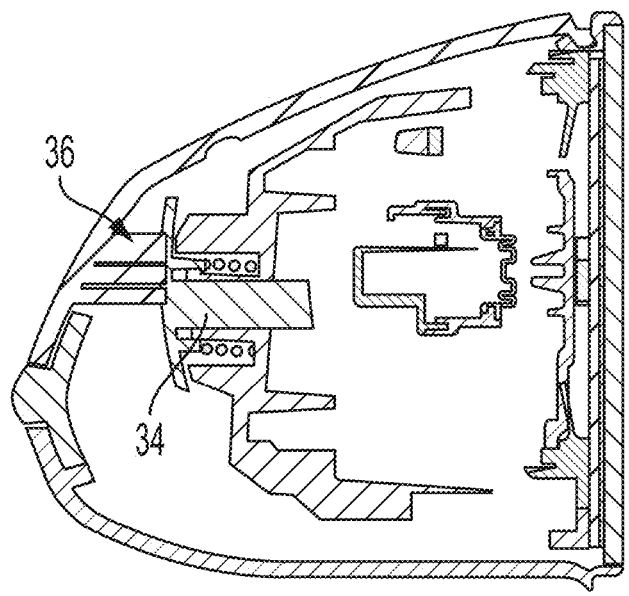
FIG. 15 is another sectional view of the mirror head of FIG. 13.
Figure 17:
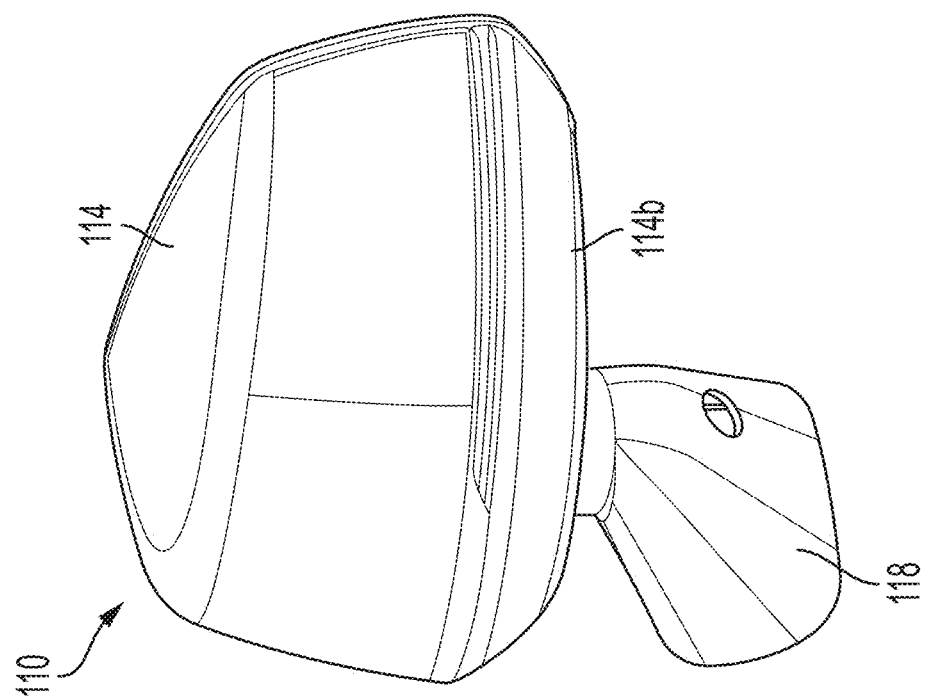
FIGS. 16 and 17 are perspective views of another mirror assembly in accordance with the present invention.
Figure 16:
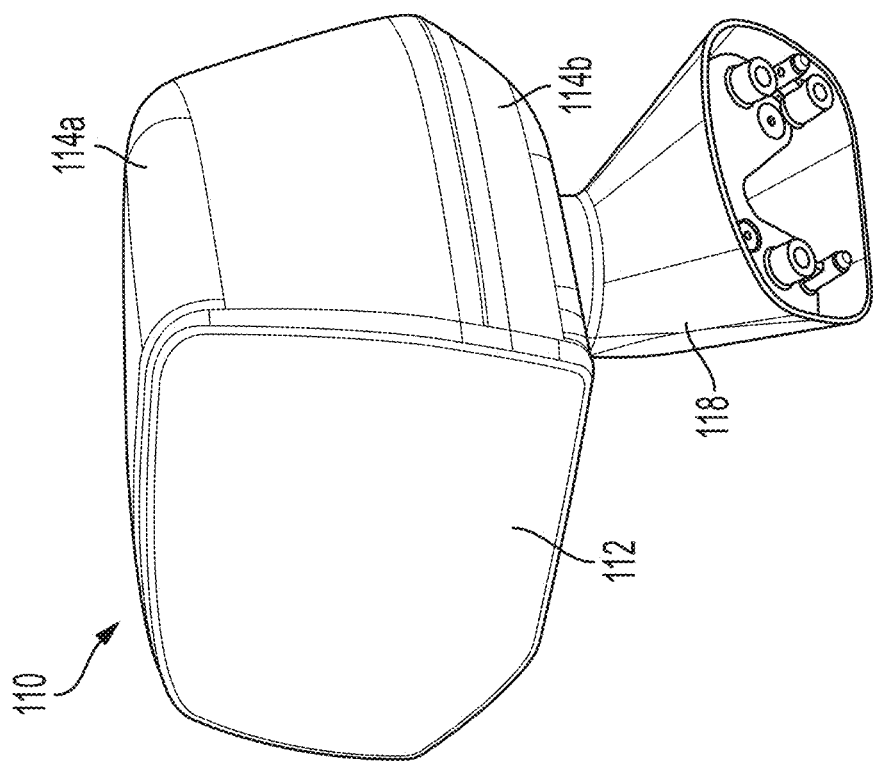

Optionally, and such as shown in FIGS. 13-15, the mirror head may include an additional spring-loaded touch-off component or stability element 34 disposed between the housing or casing and the glass actuator bracket. As shown in FIGS. 13-15, the spring-loaded component 34 may be disposed near the outboard forward side of the mirror head, and provides further stability when the mirror head is subjected to high speed wind-loads as may be encountered as the vehicle travels along a highway or the like. In the illustrated embodiment, the mirror head includes a boss or projection 36 at its inner surface, while the actuator bracket includes a spring-loaded element 34 that is urged rearward toward the mirror casing and that engages the boss or projection to provide a biasing or stabilizing force at the mirror casing. The spring-loaded element has a curved (such as spherically curved) surface that engages a correspondingly curved (such as spherically curved) surface of the boss or projection of the mirror casing, such that the spring-loaded element engages the boss or projection throughout the range of adjustment of the mirror head relative to the bracket and mounting base.

Figure 18:
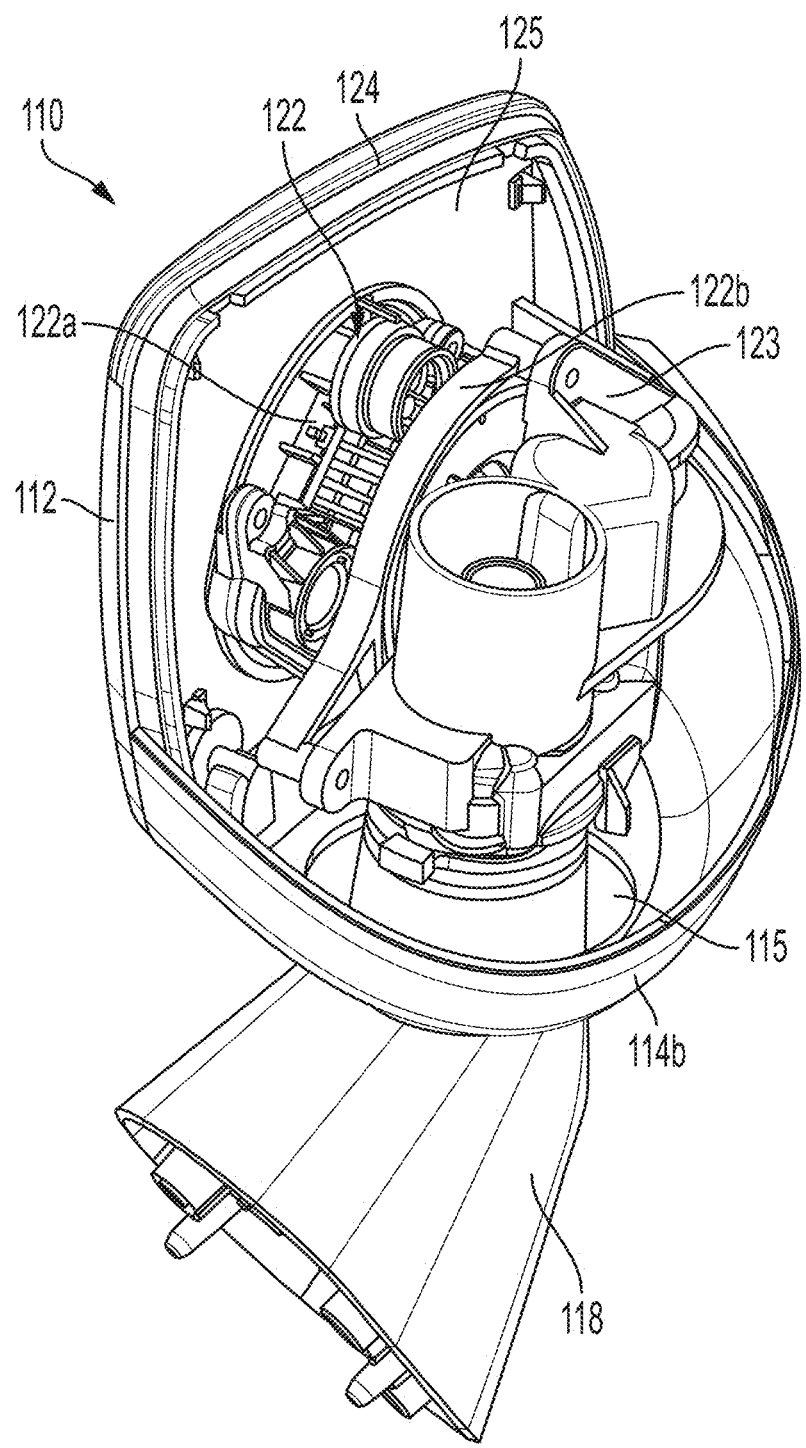
FIG. 18 is a perspective view of the mirror assembly of FIG. 16, with the mirror casing removed to show the actuator and bracket.
Figure 19:
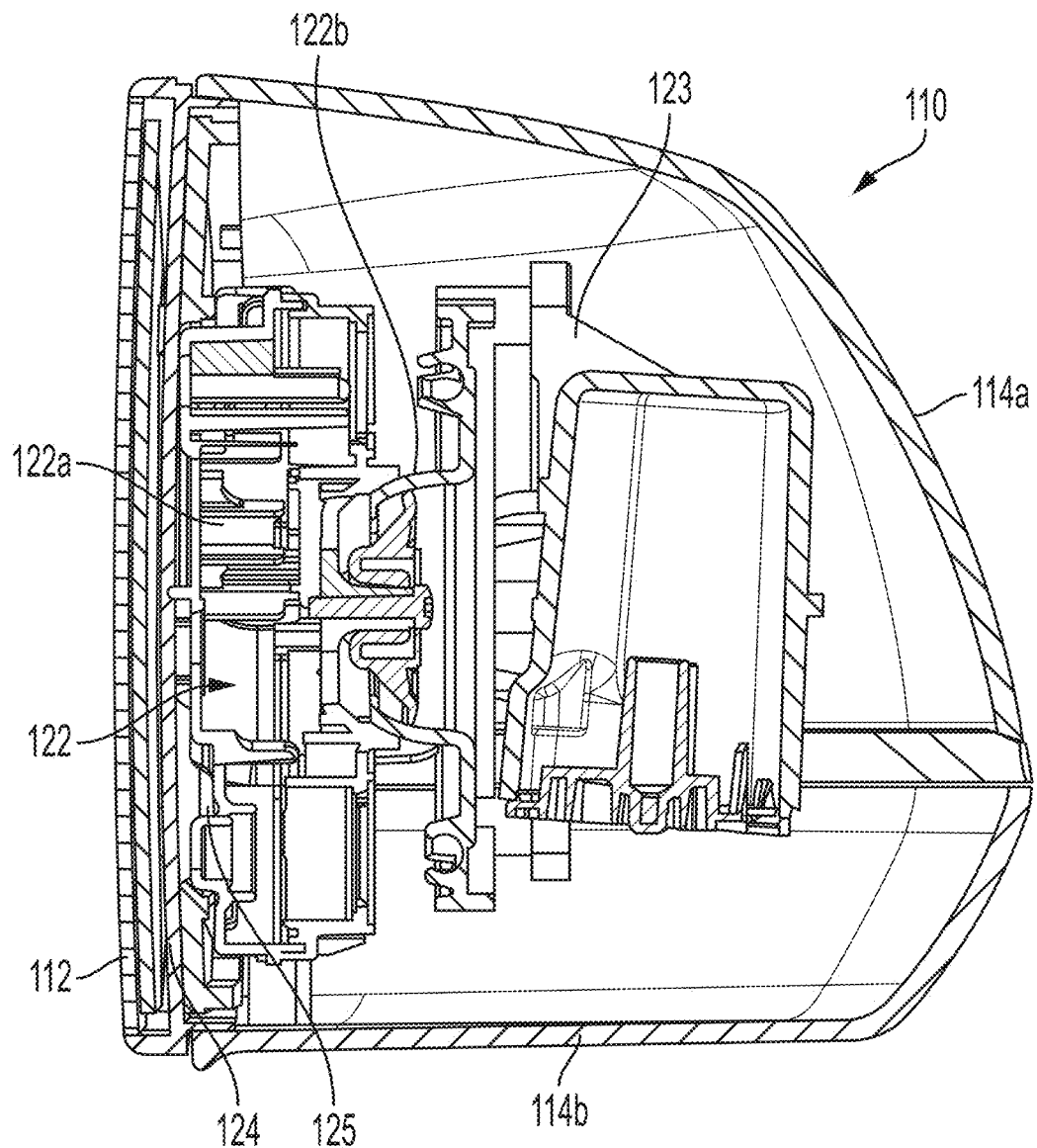
FIG. 19 is a sectional view of the mirror assembly of FIG. 16.
Figure 20:
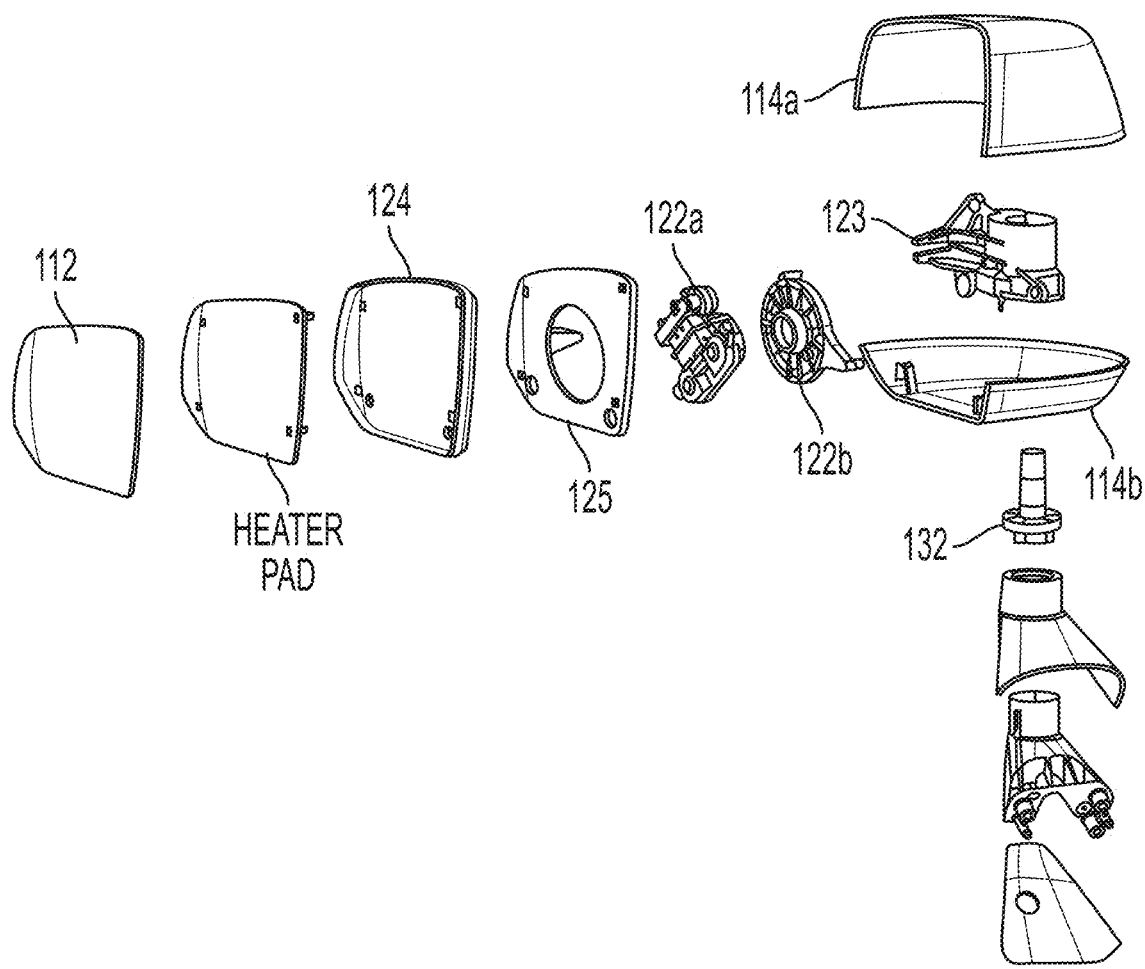
FIG. 20 is an exploded perspective view of the mirror assembly of FIG. 16.

Although described above as being attached at the bracket, the actuator may alternatively be attached at the mirror back plate, whereby the actuator engages the bracket such that actuation of the actuator adjusts the back plate (and mirror reflective element and mirror casing) relative to the bracket and mounting base. For example, and such as shown in FIGS. 16-20, the mirror assembly 110 includes a mirror reflective element 112 and upper and lower mirror housing or casing 114a, 114b that are adjustable via an actuator 122 relative to a mounting arm or base 118. As shown in FIGS. 18 and 19, the mirror actuator 122 has its body or base 122a (that houses the actuator motors) attached at an actuator attachment plate 125 at the mirror back plate 124, while the actuator adapter plate 122b is attached at the bracket 123.

By positioning the larger or deeper portion of the actuator (the body with motors) at the reflective element and the thinner portion of the actuator (the adapter plate), the pivot between the reflective element and the bracket (the pivot of the actuator at the interface between the actuator body and the adapter plate) is moved closer to the bracket and closer to the pivot of the powerfold actuator (at the pivot tube and detent mechanism 132). By positioning the pivots closer together, the hole 115 that receives the outer end of the mounting arm or base portion can be smaller because the hole region is closer to the pivot and the movement of the mirror casing at the hole region is thus reduced.

Thus, the exterior rearview mirror assembly 110 reverses the mounting of the mirror actuator by rigidly attaching the body of the actuator to a plate behind the mirror glass. The adapter plate of the mirror actuator (which is traditionally fixed behind the mirror reflective element) is fixed to the inner bracket of the mirror head. This mounting scheme reduces and minimizes the distance between the glass actuator pivot and the powerfold pivot, thereby reducing the size of the hole where the outer end region of the mirror mounting arm or base enters the mirror head.

Because the mirror head (instead of just the mirror reflective element) pivots to adjust the rearward field of view for the driver of the vehicle (when the mirror head is in the use or extended position), any accessory, such as a turn signal indicator or blind spot indicator or the like, that is disposed in the mirror head may be adapted so that the accessory function provides the desired or appropriate function, such that, for example, an indicator emits light toward the appropriate location, regardless of how the mirror head may be adjusted. For example, and such as can be seen with reference to FIG. 21, a turn signal indicator may be disposed at the outboard region of the mirror casing and mirror head and may operate to emit light rearward along the side of the vehicle so as to be viewable by a driver of another vehicle rearward and/or at the side lane adjacent to the equipped vehicle (such as a rearward overtaking vehicle or the like). There are regulations for such turn signal indicators that require the light emitted by the turn signal indicator to be viewable through a range of angles at the side of the vehicle.

Figure 21:
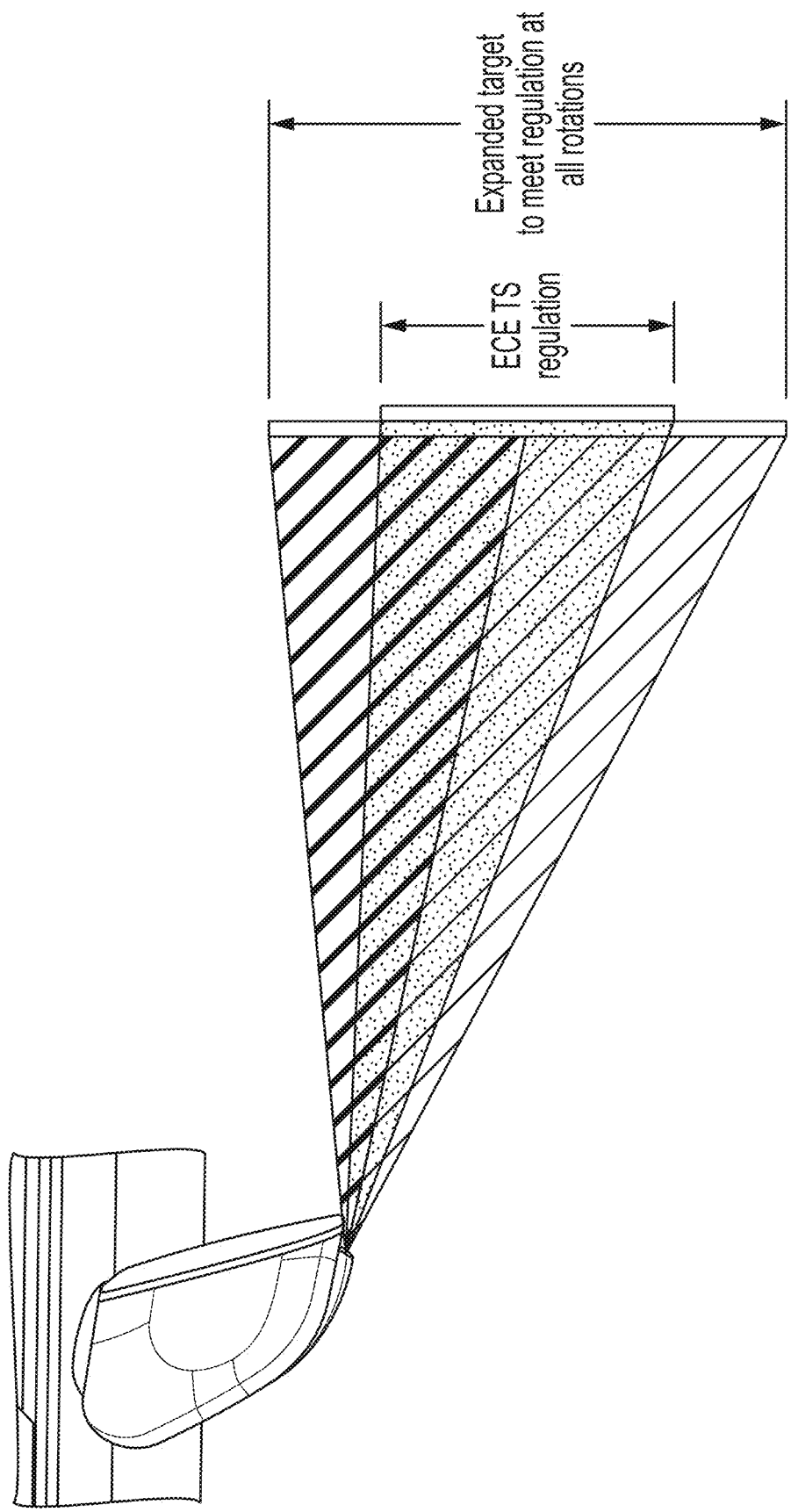
FIG. 21 is a plan view of the mirror assembly of the present invention as mounted at a side region of a vehicle, showing the range that a turn signal indicator should cover to accommodate adjustment of the mirror head.
Figure 22:
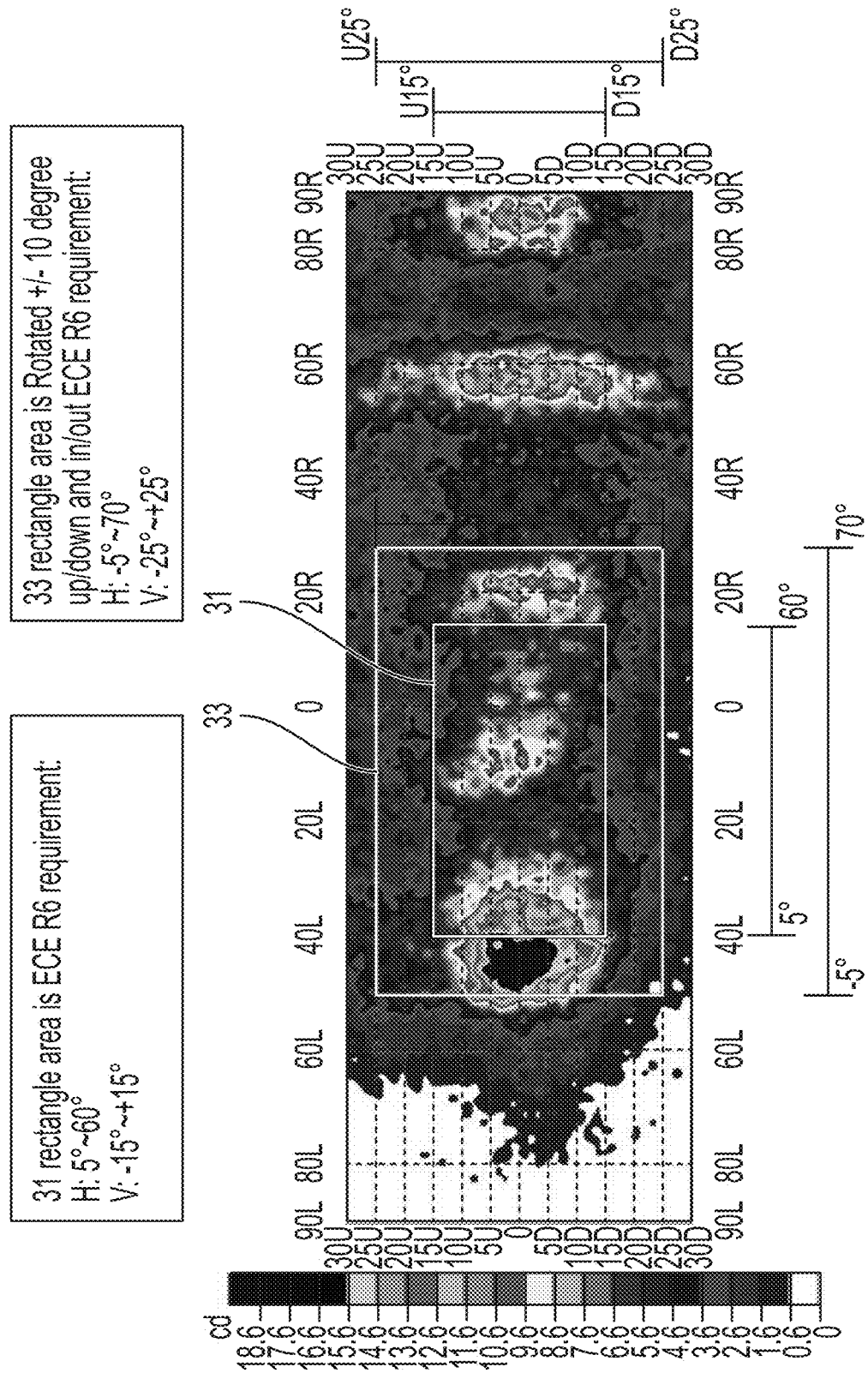
FIG. 22 is a chart showing illumination requirements for the turn signal indicator.

Because the mirror head (including the turn signal indicator) adjusts (as can be seen via the different positions of the mirror head shown in FIG. 21), the beam or cone of light emitted by the turn signal indicator also adjusts with the mirror head. The turn signal regulations (such as an ECE regulation or the like, such as ECE R48 (Uniform Provisions Concerning the Approval of Vehicles with Regard to the Installation of Lighting and Light-Signaling Devices), which is hereby incorporated herein by reference in its entirety, or such as an SAE standard, such as SAE J914 (Surface Vehicle Standard), which is hereby incorporated herein by reference in its entirety) must be met at all housing rotations. To accommodate for this, the indicator light emitting diodes (LEDs) and optics are configured so that a cone or beam of light is emitted by the indicator that meets the regulated intensity and that is wide enough to encompass the regulated region throughout the range of adjustment of the mirror head relative to the side of the vehicle. As shown in FIG. 21, the image regulation target zone for light output can be expanded by the degrees of rotation vertically and horizontally to meet the regulation. Both the vertical span and the horizontal span of the emitted light beam or cone may be expanded to meet the regulations/requirements for all mirror head positions. For example, and such as shown in FIG. 22, for the ECE requirement that at least a threshold intensity of emitted light must be within a window or region 31 that spans 5 degrees to 60 degrees horizontally (relative to the side of the vehicle) and −15 degrees to 15 degrees vertically, the indicator may emit such a threshold light intensity over a larger region, such as a region 33 that spans −5 degrees to 70 degrees horizontally (relative to the side of the vehicle) and −25 degrees to 25 degrees vertically, so that, as the mirror head is adjusted during use, the threshold intensity of light will be provided at the required region 31. When so expanded, the light is within the regulation requirements irrespective of the position of the mirror head relative to the side of the vehicle. Because the indicator/light source moves with the mirror head, the indicator (such as the LEDs and/or optics of the indicator) is configured to create a large enough rectangle for the ECE R48 and/or SAE J914 required uniform light and threshold intensity light, so that the regulated light intensity and uniformity is provided at the required window or region.

Figure 23:
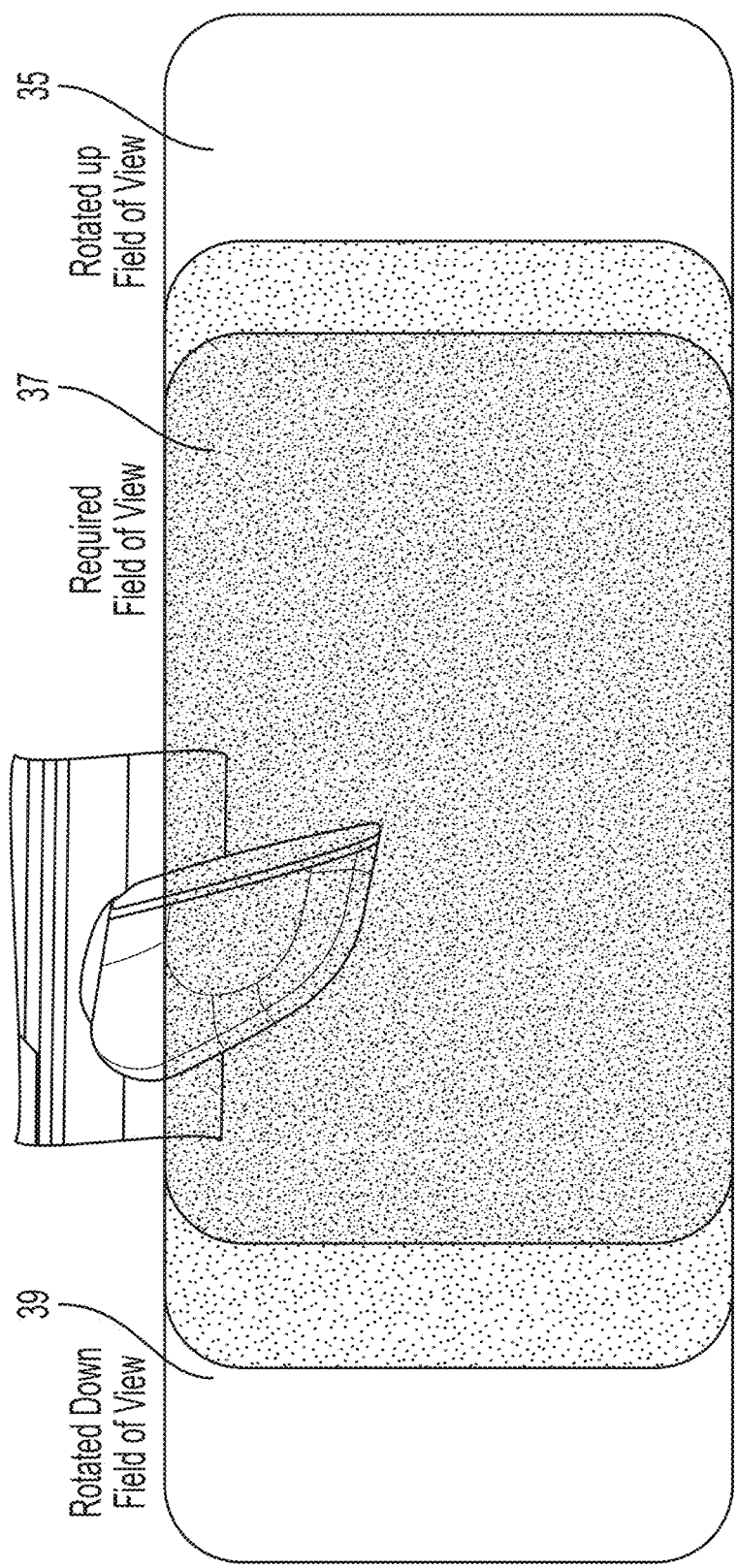
FIG. 23 is another plan view of the mirror assembly of the present invention as mounted at a side region of a vehicle, showing the range that a field of view of a camera should encompass to accommodate adjustment of the mirror head.
Figure 24C:
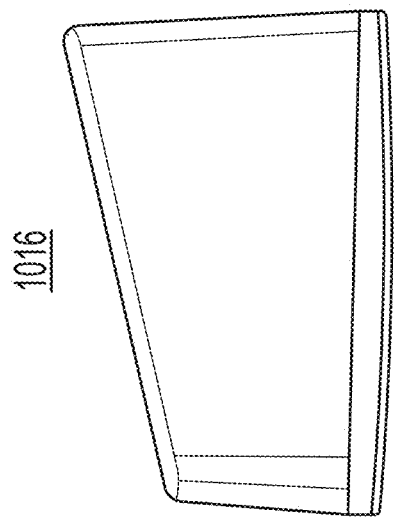
FIGS. 24A-C are plan views of the mirror casing supporting reflective elements having different radii of curvature.
Figure 24B:
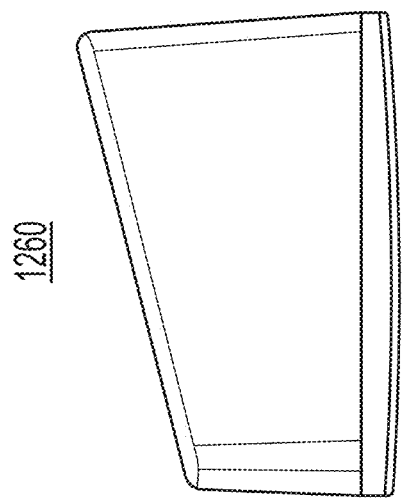
Figure 24A:
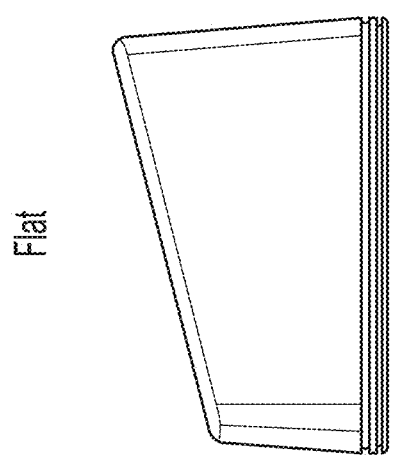
Figure 25C:
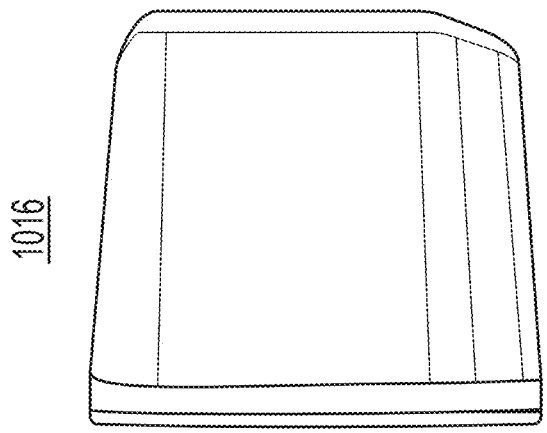
FIGS. 25A-C are side elevations of the mirror casing and reflective elements of FIGS. 24A-C, respectively.
Figure 25B:
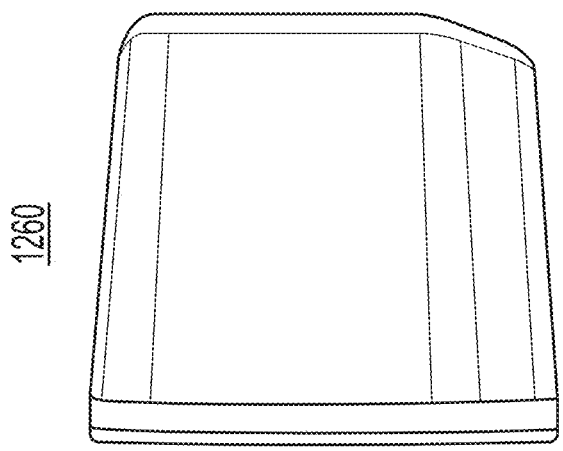
Figure 25A:
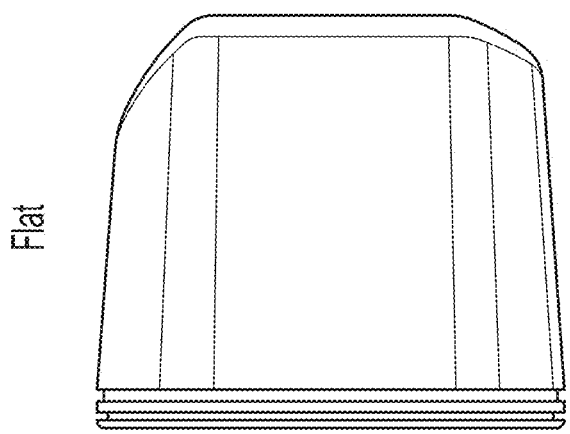

Similarly, for a mirror mounted camera (that is mounted at the mirror head or mirror casing and thus that pivots or moves with the mirror head when the mirror reflective element is adjusted to provide the desired or selected rearward field of view for the driver of the vehicle), the camera's field of view should be expanded so as to encompass a required area or region for all mirror head positions. For example, and such as shown in FIG. 23, the camera (such as a camera installed at the mirror head that is part of a multi-camera surround vision/birds-eye view system of the equipped vehicle) moves with the mirror head and mirror reflective element. The camera thus should have an extra or expanded field of view (such as achieved via a wide angle lens) such that the camera's field of view encompasses the required region throughout the range of adjustment of the mirror head (when in the extended or non-folded orientation). As shown in FIG. 23, the camera may have a wide angle field of view that, when the mirror is rotated up (see 35), fully encompasses the required field of view (see 37), and when the mirror is rotated down (see 39), still fully encompasses the required field of view 37. The camera may be part of a multi-camera surround view system of the vehicle, which may utilize aspects of the systems described in U.S. Pat. Nos. 9,900,522; 9,834,153; 9,762,880 and/or 9,126,525, and/or U.S. Publication Nos. US-2015-0022664; US-2014-0340510 and/or US-2012-0162427, which are all hereby incorporated herein by reference in their entireties.

Optionally, the camera may have a wider field of view and an image processor may process image data captured by the camera to dynamically and digitally crop the image appropriately at any possible mirror head position. The processor may dynamically and digitally crop the image data responsive to the location or orientation of the mirror head so that the image data is dynamically cropped as a function of movement of the mirror head. For example, the camera or processor may read an actuator memory voltage to determine the orientation of the mirror head relative to the side of the vehicle and thus to determine the appropriate crop parameters. When cropped, the cropped frame of image data captured by the camera provides the appropriate field of view that encompasses the appropriate or required region at the side of the vehicle (such as for object detection and/or for a surround view display system of the vehicle). The image data of the cropped frame may be further processed for object detection and/or may be used for a surround view display or the like, while the image data outside of the cropped frame may be ignored.

Optionally, the accessory may be adjustably mounted at the mirror head and may be adjusted to maintain its direction or field of view or beam of light (such as its field of view for a camera or beam direction for an indicator) as the mirror head is adjusted relative to the vehicle to adjust the rearward field of view of the reflective element as viewed by the driver. In such an application, the adjustment mechanism for the accessory is operable responsive to the change in position of the mirror head.

Thus, the mirror assembly of the present invention provides a mirror head that supports the mirror reflective element at the mirror casing and that pivots or adjusts relative to the mounting base and the side of the vehicle to provide a driver's rearward field of view. The mirror casing may provide a universal mirror casing, where a selected mirror reflective element may be attached at the mirror casing. For example, and such as shown in FIGS. 24A-C and 25A-C, the variation in the glass curvature (for example, flat, a 1260 mm radius of curvature, and a 1016 mm radius of curvature) can be implemented by a change in the glass case while keeping the housing styling the same.

Optionally, the mirror assembly of the present invention may include a blind spot mirror (FIGS. 26-28) comprising an auxiliary wide angle reflective element 40 disposed at an upper outboard corner or region of the mirror head, with the principal mirror reflective element 12' formed to partially circumscribe the inner perimeter region of the auxiliary element. The auxiliary element comprises a curved reflective surface (such as by utilizing aspects of the mirror elements described in U.S. Pat. No. 9,694,750, which is hereby incorporated herein by reference in its entirety). In the illustrated embodiment, the exterior surface of the auxiliary element is generally co-planar with the exterior surface of the principal reflective element, while providing a frameless reflective element construction around the periphery of the reflective element and mirror head (optionally with a demarcation or back plate portion disposed between the auxiliary reflective element and principal reflective element). A similar ground and polished homologated rounded edge may be provided for the blind zone mirror or auxiliary reflective element and the main glass or principal reflective element.

Figure 28:
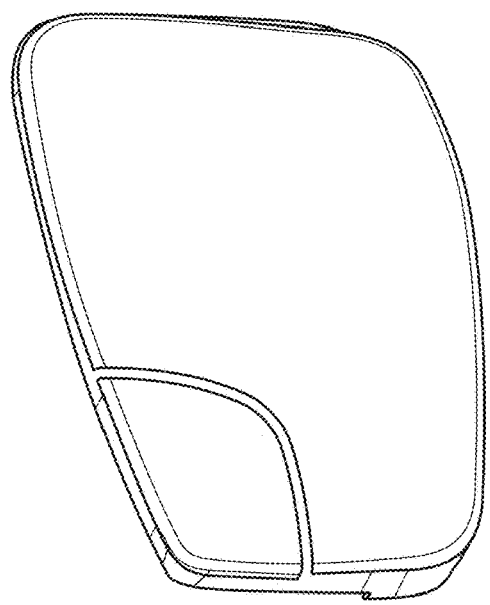
FIG. 28 is another perspective view of the mirror reflective element of FIG. 26.
Figure 27:
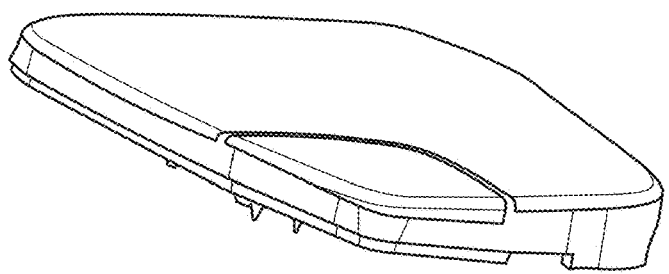
FIG. 27 is another perspective view of the mirror reflective element of FIG. 26.
Figure 26:
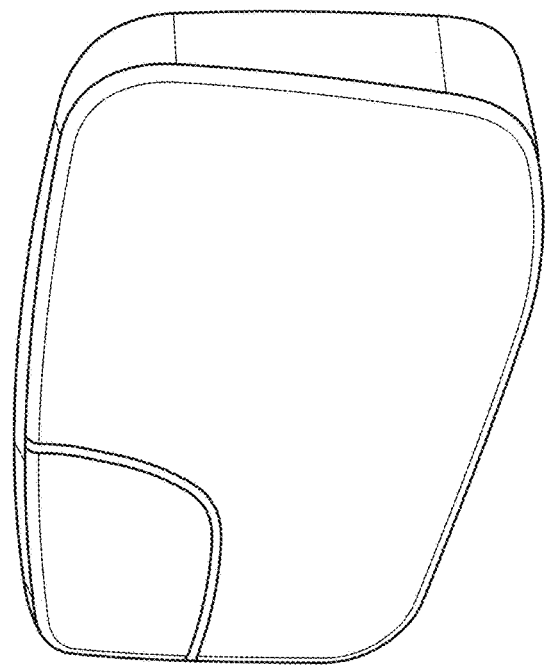
FIG. 26 is a perspective view of another mirror reflective element of the present invention, shown with a flush wide angle auxiliary mirror reflector.

For example, and such as shown in FIGS. 26-28, the outer perimeter edge regions of the auxiliary reflective element are rounded so that they correspond with the outer perimeter edge regions of the principal reflective element. In such an application, the principal mirror reflective element and the auxiliary reflective element cooperate to provide a rounded or ground perimeter edge region at the periphery of the front surface of the combined reflective element, with the rounded or ground or polished perimeter edge regions of the glass substrates of the reflective elements exposed to or viewable by the driver of the vehicle (and which optionally may comprise a polished perimeter that is polished to a water-clear finish and may have a radius of curvature of at least about 2.5 mm). The rounded perimeter edges of the glass substrates of the mirror reflective elements may provide a generally smooth or continuous transition from the respective generally planar (or curved) front surfaces of the mirror reflective elements to the outer surface of the mirror head or mirror casing at which the mirror reflective elements are mounted.

The inboard perimeter edge regions of the auxiliary reflective element and the perimeter edge regions of the principal reflective element that are at the cutout region (such as the outboard upper corner region) where the auxiliary reflective element is disposed are not rounded and provide a generally planar flush surface at the junction or demarcation line between the auxiliary reflective element and the principal reflective element. In the illustrated embodiment, a gap between the auxiliary reflective element and the principal reflective element is filled with a demarcation element, such as a lip or portion of the mirror back plate. The demarcation lip or portion of the back plate is molded or formed to follow the shape of the cut out region of the principal reflective element and the inboard perimeter edges of the auxiliary reflective element when the auxiliary reflective element and the principal reflective element are disposed at or attached at or adhered at the back plate.

Figure 29:
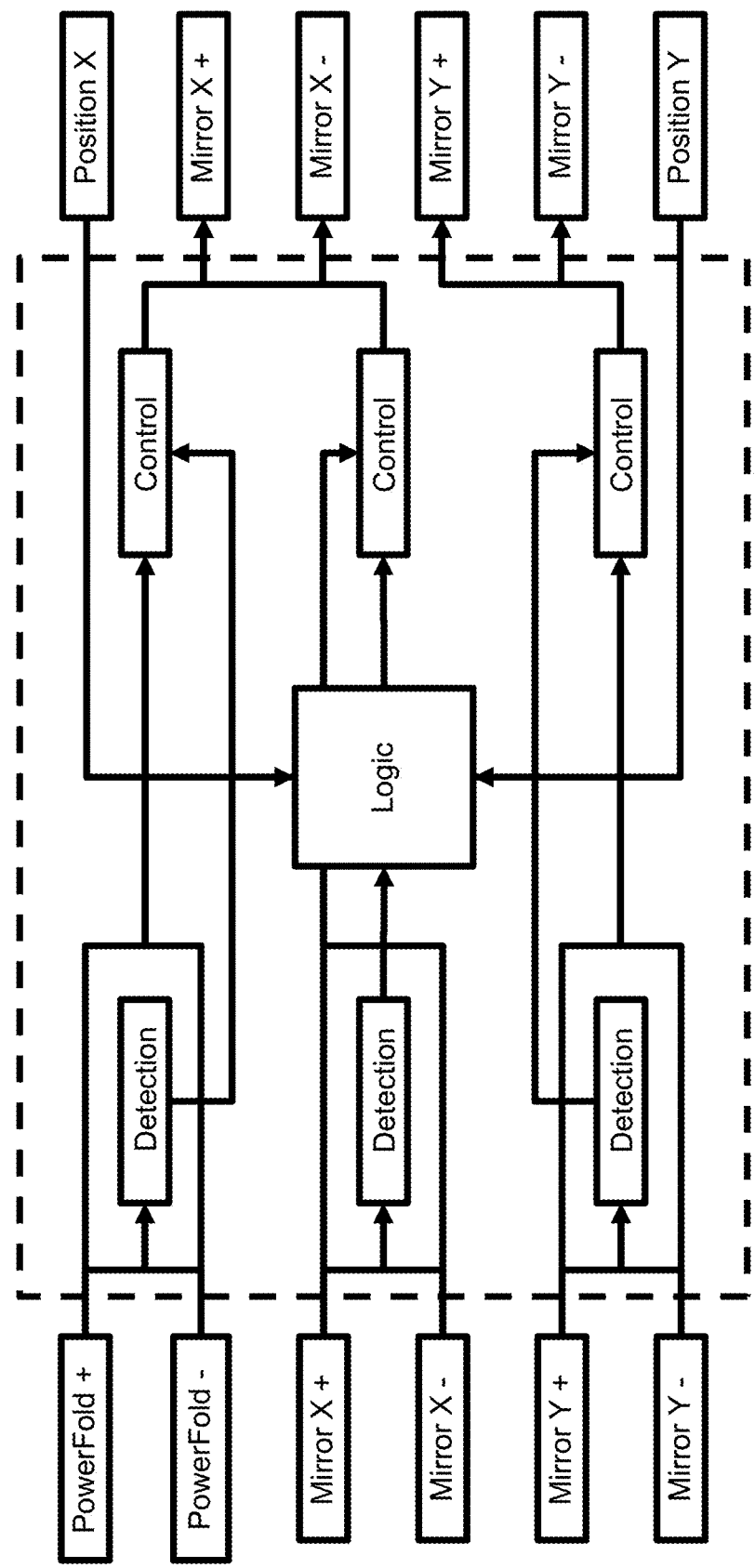
FIG. 29 is block diagram showing a control function for the mirror assembly of the present invention.

The mirror head is adjusted via the actuator or actuators, which are via a control or controller (see FIG. 29). The control schematic of FIG. 29 receives three pair of inputs from the vehicle (vertical and horizontal glass actuation and powerfold actuation) and provides two pair of outputs (Mirror X+, X−, Y+, Y−) to a two motor actuator (that may provide adjustment of the mirror head for rearview adjustment and for powerfold adjustment, such as by utilizing aspects of the mirror assemblies and actuators disclosed in U.S. Publication No. US-2015-0224930 and/or U.S. Pat. Nos. 9,827,913 and/or 8,915,601, which are hereby incorporated herein by reference in their entireties). To differentiate the horizontal glass motion from the powerfold motion, the controller sends a modulated signal that reduces the horizontal speed for glass motion, and allows for full speed for powerfold motion. The vertical adjustment speed (Mirror Y+, Y−) may be at the same speed (or a different speed) as the reduced horizontal speed for glass motion. The sensors can be implemented in order to compensate for differences in drive voltage and temperature.

Thus, the mirror actuator may comprise a two-motor actuator that is operable to pivot the mirror head horizontally and vertically via respective motors. The two-motor actuator may also be operable to pivot the mirror head relative to the base portion between a folded or non-use position and an extended or use position. The two-motor actuator, when electrically powered to horizontally adjust the mirror reflective element, pivots the mirror head at a rate that is slower than a rate of horizontally pivoting of the mirror head when pivoting the mirror head between the folded or non-use position and the extended or use position.

The exterior rearview mirror assembly of the present invention provides a frameless exterior rearview mirror assembly. The actuator adjusts the reflective element in tandem with the mirror casing, and the circumferential perimeter edges of the outermost glass substrate of the mirror reflective element are exposed and contactable by a person and are rounded with a radius of curvature of at least 2.5 mm, so as to mitigate injury to that person upon contact.

Optionally, accessories, such as turn signal indicators or ground illumination lights or spotlights or cameras, can be disposed at the mounting arm/base attached at the vehicle so that any light beam axis or camera viewing axis remains unchanged when the mirror head adjusts relative to the mounting arm/base.

The mirror assembly of the present invention allows for inclusion of other accessories (such as turn signal indicators, blind spot indicators, lights, displays and/or the like) in the mirror head, without concerns of interference with conventional actuators disposed in the mirror head and at and behind the mirror reflective element. The exterior rearview mirror assembly and/or actuators may utilize aspects of the exterior rearview mirror assemblies described in U.S. Pat. Nos. 9,827,913; 9,346,403; 9,067,541; 8,915,601; 8,764, 256; 7,722,199; 7,314,285; 7,267,449; 7,159,992; 7,104, 663; 7,093,946; 7,080,914; 7,073,914; 6,916,100; 6,755, 544; 6,698,905; 6,685,864; 6,467,920; 6,362,548; 6,312, 135; 6,243,218; 6,229,226; 6,213,612; 5,986,364; 5,900,999 and/or 5,703,731, and/or U.S. Publication No. US-2007-002477, which are all hereby incorporated herein by reference in their entireties.

Optionally, for example, the technology of the present invention allows for new technology or content to be readily added to and mounted into the mirror head. For example, the mirror head may include a camera disposed behind the reflective element, and/or the mirror head may include a display screen (such as a liquid crystal display screen or the like) disposed behind the reflective element and/or the mirror head may include any other electronic or mechanical content, such as, for example, a blind spot indicator and/or a turn signal indicator and/or an illumination module and/or wide angle reflector elements and/or the like (such as by utilizing aspects of the exterior mirror assemblies described in U.S. Pat. Nos. 8,786,704; 8,058,977; 7,944,371; 7,492, 281; 6,198,409; 5,929,786; 5,786,772; 7,626,749; 7,581, 859; 6,227,689; 6,582,109; 5,371,659; 5,497,306; 5,669, 699; 5,823,654; 6,176,602; 6,276,821; 7,748,856; 7,255, 451; 7,195,381; 6,717,712; 7,126,456; 6,315,419; 7,097,312 and/or 6,522,451, which are hereby incorporated herein by reference in their entireties).

Optionally, the reflective element may comprise a frameless reflective element, such as the types shown and/or described in U.S. Pat. Nos. 7,253,723; 8,154,418; 8,508, 831; 8,730,553; 9,598,016 and/or 9,346,403, and/or U.S. Publication Nos. US-2014-0313563 and/or US-2015-0097955, which are hereby incorporated herein by reference in their entireties. In such an application, the mirror reflective element may have a rounded or ground perimeter edge region at its periphery of the front surface, and such a rounded or ground or polished perimeter edge region of the glass substrate of the reflective element may be exposed to or viewable by the driver of the vehicle and may comprise a polished perimeter that is polished to a water-clear finish and may have a radius of curvature of at least about 2.5 mm. The rounded perimeter edge of the glass substrate of the mirror reflective element may provide a generally smooth or continuous transition from the generally planar (or slightly curved) front surface of the mirror reflective element to the outer surface of the mirror head or mirror casing at which the mirror reflective element is mounted. Optionally, the mirror reflective element may have a thin or very thin bezel at the perimeter region of the front surface of the reflective element, and optionally, the mirror reflective element may have a clear bezel at the perimeter region of the front surface of the reflective element, or the like, depending on the particular application of the mirror assembly and the desired appearance and/or styling of the mirror assembly.

Optionally, other mirror designs or configurations may be contemplated in accordance with the present invention, such as various configurations of the mirror casing and reflective element and any bezel at the mirror reflective element. For example, the mirror assembly may include a plastic molding that comprises a portion that (a) abuts a circumferential edge of the mirror glass substrate (such as the front glass substrate of an electrochromic mirror reflective element or a glass prism of a prismatic mirror reflective element) and (b) has an outer curved surface that extends from generally adjacent to a first surface of the glass substrate and that may lack a sharp edge, such as described in U.S. Pat. Nos. 7,255,541; 7,289, 037; 7,360,932; 8,049,640 and/or 8,529,108, which are hereby incorporated herein by reference in their entireties. Optionally, the mirror assembly may include a conventional bezel, such as described in U.S. Pat. No. 7,224,324, which is hereby incorporated herein by reference in its entirety.

Optionally, the mirror assembly may include various other features, such as lighting and/or indicators and/or blind spot detectors and/or wide angle reflectors or spotter mirrors and/or the like. For example, the mirror assembly may include any other electronic or mechanical content, such as, for example, a blind spot indicator and/or a turn signal indicator and/or an illumination module and/or wide angle reflector elements and/or the like (such as by utilizing aspects of the exterior mirror assemblies described in U.S. Pat. Nos. 8,786,704; 8,058,977; 7,944,371; 7,626,749; 7,492,281; 6,198,409; 5,929,786; 5,786,772; 7,581,859; 6,227,689; 6,582,109; 5,371,659; 5,497,306; 5,669,699; 5,823,654; 6,176,602; 6,276,821; 7,748,856; 7,255,451; 7,195,381; 6,717,712; 7,126,456; 6,315,419; 7,097,312 and/ or 6,522,451, which are hereby incorporated herein by reference in their entireties).

Optionally, the mirror element may include a blind spot viewing auxiliary wide angle spotter mirror element that may be of the integrated type (such as described in U.S. Pat. No. 6,315,419 and/or U.S. Pub. No. US-2008-0225421, which are hereby incorporated herein by reference in their entireties) or that may be a coplanar type or a circular spotter type or a WideVue™ type or construction (such as supplied by *Magna* Mirrors of America, Inc., of Holland, Mich.), such as in accordance with U.S. Pat. Nos. 6,522,451; 6,717, 712; 7,167,294; 7,589,883 and/or 8,267,534, which are hereby incorporated herein by reference in their entireties. Also, the unitary reflective element sub-assembly may comprise an extended field of view mirror reflective element, such as a reflective element utilizing aspects of the mirrors described in U.S. Pat. No. 7,420,756, which is hereby incorporated herein by reference in its entirety.

As discussed above, the mirror assembly may comprise an electro-optic or electrochromic mirror assembly that includes an electro-optic or electrochromic reflective element. The perimeter edges of the reflective element may be encased or encompassed by the perimeter element or portion of the bezel portion to conceal and contain and envelop the perimeter edges of the substrates and the perimeter seal disposed therebetween. The electrochromic mirror element of the electrochromic mirror assembly may utilize the principles disclosed in commonly assigned U.S. Pat. Nos. 8,503, 061; 7,274,501; 7,255,451; 7,195,381; 7,184,190; 6,690, 268; 5,140,455; 5,151,816; 6,420,036; 6,178,034; 6,154, 306; 6,002,544; 5,567,360; 5,525,264; 5,610,756; 5,406, 414; 5,253,109; 5,076,673; 5,073,012; 5,117,346; 5,724, 187; 5,668,663; 5,910,854; 5,142,407 and/or 4,712,879, which are hereby incorporated herein by reference in their entireties.

The exterior rearview mirror assembly may include a casing, such as described above, or the mirror assembly may comprise or utilize aspects of other types of casings or the like, such as described in U.S. Pat. Nos. 7,338,177; 7,289, 037; 7,249,860; 6,439,755; 4,826,289 and/or 6,501,387, which are all hereby incorporated herein by reference in their entireties, without affecting the scope of the present invention. For example, the mirror assembly may utilize aspects of the flush or frameless or bezelless reflective elements described in U.S. Pat. Nos. 7,626,749; 7,360,932; 7,289,037; 7,255,451; 7,274,501 and/or 7,184,190, and/or in U.S. Pat. Pub. No. US-2006-0061008, which are all hereby incorporated herein by reference in their entireties.

Changes and modifications in the specifically described embodiments may be carried out without departing from the principles of the present invention, which is intended to be limited only by the scope of the appended claims as interpreted according to the principles of patent law.

The invention claimed is:

1. An exterior rearview mirror assembly configured for mounting at an exterior portion of a vehicle, said exterior rearview mirror assembly comprising:

a base portion configured for attachment at an exterior portion of a vehicle equipped with said exterior rearview mirror assembly to mount said exterior rearview mirror assembly at the equipped vehicle;

a mirror head comprising a mirror casing and a mirror reflective element, wherein said mirror reflective element comprises a front side and a rear side, and wherein, with said exterior rearview mirror assembly mounted at the equipped vehicle, the front side of said mirror reflective element is exposed and viewable by a driver of the equipped vehicle when the driver is operating the equipped vehicle;

a mirror actuator comprising a body portion and an adapter plate, wherein said body portion of said mirror actuator houses electrically operated motors, and wherein said motors, when electrically operated, adjust said adapter plate relative to said body portion;

wherein said base portion extends through an aperture in said mirror casing;

wherein said body portion of said mirror actuator is attached at the rear side of said mirror reflective element, and wherein said adapter plate of said mirror actuator is attached at a bracket at said base portion;

wherein, when said motors of said mirror actuator are electrically operated, movement of said body portion of said mirror actuator relative to said adapter plate moves said mirror casing and said mirror reflective element together and in tandem relative to said adapter plate;

wherein said mirror actuator, when said motors are electrically operated, adjusts said body portion, said mirror reflective element and said mirror casing together and in tandem relative to said adapter plate and said bracket at said base portion to adjust a rearward field of view of the driver viewing said mirror reflective element with said exterior rearview mirror assembly mounted at the equipped vehicle; and wherein said aperture allows for movement of said mirror casing relative to said base portion during operation of said mirror actuator without direct contact between said mirror casing and said base portion.

2. The exterior rearview mirror assembly of claim 1, comprising a powerfold actuator operable to pivot said mirror head relative to said base portion between a folded position and a use position with said exterior rearview mirror assembly mounted at the equipped vehicle, wherein said powerfold actuator is electrically operable to adjust said bracket to move said mirror reflective element, said mirror actuator and said mirror casing together and in tandem relative to said base portion to pivot said mirror head relative to said base portion between the use position and the folded position with said exterior rearview mirror assembly mounted at the equipped vehicle, and wherein said aperture allows for movement of said mirror casing relative to said base portion during operation of said powerfold actuator.

3. The exterior rearview mirror assembly of claim 1, wherein said mirror head houses an accessory that moves together and in tandem with said mirror casing and said mirror reflective element, and wherein said accessory is adapted to provide a function to meet a performance requirement throughout the range of adjustment of said mirror head relative to said base portion with said exterior rearview mirror assembly mounted at the equipped vehicle.

4. The exterior rearview mirror assembly of claim 3, wherein said accessory is disposed in said mirror casing of said mirror head and behind said mirror reflective element.

5. The exterior rearview mirror assembly of claim 3, wherein said accessory comprises a turn signal indicator, and wherein said turn signal indicator, when activated and with said exterior rearview mirror assembly mounted at the equipped vehicle, emits a beam of light that encompasses a performance-required region throughout the range of adjustment of said mirror head relative to said base portion.

6. The exterior rearview mirror assembly of claim 3, wherein said accessory comprises a camera that has an exterior field of view at the side of the vehicle with said exterior rearview mirror assembly mounted at the equipped vehicle, and wherein the camera's field of view encompasses a performance-required region throughout the range of adjustment of said mirror head relative to said base portion.

7. The exterior rearview mirror assembly of claim 6, wherein an image processor processes image data captured by said camera and crops frames of captured image data responsive to the orientation of the mirror head when the respective frames of image data were captured for processing of the performance-required region.

8. The exterior rearview mirror assembly of claim 1, comprising a flexible gasket provided at said aperture of said mirror casing to limit intrusion of contaminant into said mirror casing via said aperture into said mirror head with said exterior rearview mirror assembly mounted at the equipped vehicle, and wherein said flexible gasket allows for movement of said mirror head relative to said base portion.

9. The exterior rearview mirror assembly of claim 1, wherein said body portion of said mirror actuator is attached at a mirror back plate attached at the rear side of said mirror reflective element, and wherein said mirror back plate, said mirror casing and said mirror reflective element are movable together and in tandem relative to said base portion.

10. The exterior rearview mirror assembly of claim 1, comprising a biasing element at least partially disposed between said bracket and said mirror casing to provide a stabilizing force at said mirror casing, wherein said biasing element comprises a curved surface that engages a corresponding curved surface of said mirror casing.

11. The exterior rearview mirror assembly of claim 10, wherein said curved surface of said biasing element movably engages the corresponding curved surface of said mirror casing when said motors of said mirror actuator are electrically operated to adjust said body portion, said mirror reflective element and said mirror casing together and in tandem relative to said adapter plate and said bracket at said base portion.

12. The exterior rearview mirror assembly of claim 1, wherein said mirror reflective element comprises a frameless mirror reflective element.

13. The exterior rearview mirror assembly of claim 12, wherein said frameless mirror reflective element has a glass substrate having a rounded front perimeter along a perimeter circumference of a front surface of said glass substrate, and wherein, with said frameless mirror reflective element attached at said mirror actuator, and with said exterior rearview mirror assembly mounted at the equipped vehicle, said rounded front perimeter of said glass substrate is exposed to and contactable by and viewable by the driver of the equipped vehicle.

14. The exterior rearview mirror assembly of claim 13, comprising an auxiliary reflective element disposed at a perimeter region of said frameless mirror reflective element, and wherein an outer perimeter edge region of said auxiliary reflective element comprises a rounded perimeter that, with said frameless mirror reflective element attached at said mirror actuator, and with said exterior rearview mirror assembly mounted at the equipped vehicle, said rounded perimeter of said auxiliary reflective element is exposed to and contactable by and viewable by the driver of the equipped vehicle.

15. An exterior rearview mirror assembly configured for mounting at an exterior portion of a vehicle, said exterior rearview mirror assembly comprising:

a base portion configured for attachment at an exterior portion of a vehicle equipped with said exterior rearview mirror assembly to mount said exterior rearview mirror assembly at the equipped vehicle;

a mirror head comprising a mirror casing and a mirror reflective element, wherein said mirror reflective element comprises a front side and a rear side, and wherein, with said exterior rearview mirror assembly mounted at the equipped vehicle, the front side of said mirror reflective element is exposed and viewable by a driver of the equipped vehicle when the driver is operating the equipped vehicle;

wherein said mirror reflective element comprises a frameless mirror reflective element having a glass substrate having a rounded front perimeter along a perimeter circumference of a front surface of said glass substrate, and wherein said front surface is at said front side of said mirror reflective element;

wherein, with said exterior rearview mirror assembly mounted at the equipped vehicle, said rounded front perimeter of said glass substrate is exposed to and contactable by and viewable by the driver of the equipped vehicle;

a mirror back plate attached at the rear side of said mirror reflective element;

a mirror actuator comprising a body portion and an adapter plate, wherein said body portion of said mirror actuator houses electrically operated motors, and wherein said motors, when electrically operated, adjust said adapter plate relative to said body portion;

wherein said base portion extends through an aperture in said mirror casing;

wherein said body portion of said mirror actuator is attached at said mirror back plate attached at the rear side of said mirror reflective element, and wherein said adapter plate of said mirror actuator is attached at a bracket at said base portion;

wherein, when said motors of said mirror actuator are electrically operated, movement of said body portion of said mirror actuator relative to said adapter plate moves said mirror casing and said mirror reflective element together and in tandem relative to said adapter plate;

wherein said mirror actuator, when said motors are electrically operated, adjusts said body portion, said mirror reflective element and said mirror casing together and in tandem relative to said adapter plate and said bracket at said base portion to adjust a rearward field of view of the driver viewing said mirror reflective element with said exterior rearview mirror assembly mounted at the equipped vehicle; and wherein said aperture allows for movement of said mirror casing relative to said base portion during operation of said mirror actuator without direct contact between said mirror casing and said base portion.

16. The exterior rearview mirror assembly of claim 15, comprising a powerfold actuator operable to pivot said mirror head relative to said base portion between a folded position and a use position with said exterior rearview mirror assembly mounted at the equipped vehicle, wherein said powerfold actuator is electrically operable to adjust said bracket to move said mirror reflective element, said mirror actuator and said mirror casing together and in tandem relative to said base portion to pivot said mirror head relative to said base portion between the use position and the folded position with said exterior rearview mirror assembly mounted at the equipped vehicle, and wherein said aperture allows for movement of said mirror casing relative to said base portion during operation of said powerfold actuator.

17. The exterior rearview mirror assembly of claim 15, wherein said mirror head houses an accessory that moves together and in tandem with said mirror casing and said mirror reflective element, and wherein said accessory is adapted to provide a function to meet a performance requirement throughout the range of adjustment of said mirror head relative to said base portion with said exterior rearview mirror assembly mounted at the equipped vehicle.

18. The exterior rearview mirror assembly of claim 17, wherein said accessory is disposed in said mirror casing of said mirror head and behind said mirror reflective element.

19. The exterior rearview mirror assembly of claim 17, wherein said accessory comprises a turn signal indicator, and wherein said turn signal indicator, when activated and with said exterior rearview mirror assembly mounted at the equipped vehicle, emits a beam of light that encompasses a performance-required region throughout the range of adjustment of said mirror head relative to said base portion.

20. The exterior rearview mirror assembly of claim 17, wherein said accessory comprises a camera that has an exterior field of view at the side of the vehicle with said exterior rearview mirror assembly mounted at the equipped vehicle, and wherein the camera's field of view encompasses a performance-required region throughout the range of adjustment of said mirror head relative to said base portion.

21. The exterior rearview mirror assembly of claim 20, wherein an image processor processes image data captured by said camera and crops frames of captured image data responsive to the orientation of the mirror head when the respective frames of image data were captured for processing of the performance-required region.

22. The exterior rearview mirror assembly of claim 15, comprising a flexible gasket provided at said aperture of said mirror casing to limit intrusion of contaminant into said mirror casing via said aperture into said mirror head with said exterior rearview mirror assembly mounted at the equipped vehicle, and wherein said flexible gasket allows for movement of said mirror head relative to said base portion.

23. The exterior rearview mirror assembly of claim 15, comprising a biasing element at least partially disposed between said bracket and said mirror casing to provide a stabilizing force at said mirror casing, wherein said biasing element comprises a curved surface that engages a corresponding curved surface of said mirror casing, and wherein said curved surface of said biasing element movably engages the corresponding curved surface of said mirror casing when said motors of said mirror actuator are electrically operated to adjust said body portion, said mirror reflective element and said mirror casing together and in tandem relative to said adapter plate and said bracket at said base portion.

24. The exterior rearview mirror assembly of claim 15, comprising an auxiliary reflective element disposed at a perimeter region of said mirror reflective element, and wherein an outer perimeter edge region of said auxiliary reflective element comprises a rounded perimeter that, with said mirror reflective element attached at said mirror actuator, and with said exterior rearview mirror assembly mounted at the equipped vehicle, said rounded perimeter of said auxiliary reflective element is exposed to and contactable by and viewable by the driver of the equipped vehicle.

25. An exterior rearview mirror assembly configured for mounting at an exterior portion of a vehicle, said exterior rearview mirror assembly comprising:

a base portion configured for attachment at an exterior portion of a vehicle equipped with said exterior rearview mirror assembly to mount said exterior rearview mirror assembly at the equipped vehicle;

a mirror head comprising a mirror casing and a mirror reflective element, wherein said mirror reflective element comprises a front side and a rear side, and wherein, with said exterior rearview mirror assembly mounted at the equipped vehicle, the front side of said mirror reflective element is exposed and viewable by a driver of the equipped vehicle when the driver is operating the equipped vehicle;

wherein said mirror reflective element comprises a frameless mirror reflective element having a glass substrate having a rounded front perimeter along a perimeter circumference of a front surface of said glass substrate, and wherein said front surface is at said front side of said mirror reflective element;

wherein, with said exterior rearview mirror assembly mounted at the equipped vehicle, said rounded front perimeter of said glass substrate is exposed to and contactable by and viewable by the driver of the equipped vehicle;

a mirror actuator comprising a body portion and an adapter plate, wherein said body portion of said mirror actuator houses electrically operated motors, and wherein said motors, when electrically operated, adjust said adapter plate relative to said body portion;

wherein said base portion extends through an aperture in said mirror casing;

wherein said body portion of said mirror actuator is attached at the rear side of said mirror reflective element, and wherein said adapter plate of said mirror actuator is attached at a bracket at said base portion;

wherein, when said motors of said mirror actuator are electrically operated, movement of said body portion of said mirror actuator relative to said adapter plate moves said mirror casing and said mirror reflective element together and in tandem relative to said adapter plate;

wherein said mirror actuator, when said motors are electrically operated, adjusts said body portion, said mirror reflective element and said mirror casing together and in tandem relative to said adapter plate and said bracket at said base portion to adjust a rearward field of view of the driver viewing said mirror reflective element with said exterior rearview mirror assembly mounted at the equipped vehicle;

wherein said aperture allows for movement of said mirror casing relative to said base portion during operation of said mirror actuator without direct contact between said mirror casing and said base portion;

a flexible gasket provided at said aperture of said mirror casing to limit intrusion of contaminant into said mirror casing via said aperture into said mirror head with said exterior rearview mirror assembly mounted at the equipped vehicle, and wherein said flexible gasket allows for movement of said mirror head relative to said base portion;

wherein said mirror head houses an accessory that moves together and in tandem with said mirror casing and said mirror reflective element, and wherein said accessory is adapted to provide a function to meet a performance requirement throughout the range of adjustment of said mirror head relative to said base portion with said exterior rearview mirror assembly mounted at the equipped vehicle; and wherein at least one selected from the group consisting of (i) said accessory comprises a turn signal indicator, and wherein said turn signal indicator, when activated and with said exterior rearview mirror assembly mounted at the equipped vehicle, emits a beam of light that encompasses a performance-required region throughout the range of adjustment of said mirror head relative to said base portion, and (ii) said accessory comprises a camera that has an exterior field of view at the side of the vehicle with said exterior rearview mirror assembly mounted at the equipped vehicle, and wherein the camera's field of view encompasses a performance-required region throughout the range of adjustment of said mirror head relative to said base portion.

26. The exterior rearview mirror assembly of claim 25, comprising a powerfold actuator operable to pivot said mirror head relative to said base portion between a folded position and a use position with said exterior rearview mirror assembly mounted at the equipped vehicle, wherein said powerfold actuator is electrically operable to adjust said bracket to move said mirror reflective element, said mirror actuator and said mirror casing together and in tandem relative to said base portion to pivot said mirror head relative to said base portion between the use position and the folded position with said exterior rearview mirror assembly mounted at the equipped vehicle, and wherein said aperture allows for movement of said mirror casing relative to said base portion during operation of said powerfold actuator.

27. The exterior rearview mirror assembly of claim 25, comprising a biasing element at least partially disposed between said bracket and said mirror casing to provide a stabilizing force at said mirror casing, wherein said biasing element comprises a curved surface that engages a corresponding curved surface of said mirror casing, and wherein said curved surface of said biasing element movably engages the corresponding curved surface of said mirror casing when said motors of said mirror actuator are electrically operated to adjust said body portion, said mirror reflective element and said mirror casing together and in tandem relative to said adapter plate and said bracket at said base portion.

28. The exterior rearview mirror assembly of claim 25, comprising an auxiliary reflective element disposed at a perimeter region of said mirror reflective element, and wherein an outer perimeter edge region of said auxiliary reflective element comprises a rounded perimeter that, with said mirror reflective element attached at said mirror actuator, and with said exterior rearview mirror assembly mounted at the equipped vehicle, said rounded perimeter of said auxiliary reflective element is exposed to and contactable by and viewable by the driver of the equipped vehicle.

* * * * *

UNITED STATES PATENT AND TRADEMARK OFFICE
CERTIFICATE OF CORRECTION

PATENT NO. : 11,148,596 B2
APPLICATION NO. : 16/640553
DATED : October 19, 2021
INVENTOR(S) : Gregory A. Huizen et al.

Page 1 of 1

It is certified that error appears in the above-identified patent and that said Letters Patent is hereby corrected as shown below:

In the Specification

Column 3
Line 48, "PCT/162018/056228" should be --PCT/IB2018/056228--

Signed and Sealed this
Thirtieth Day of November, 2021

Drew Hirshfeld
*Performing the Functions and Duties of the*
*Under Secretary of Commerce for Intellectual Property and*
*Director of the United States Patent and Trademark Office*